United States Patent
Zhou et al.

(10) Patent No.: US 11,269,201 B2
(45) Date of Patent: Mar. 8, 2022

(54) MULTI-LAYER P-N JUNCTION BASED PHASE SHIFTER AND METHODS OF MANUFACTURING AND USING THE SAME

(71) Applicant: Source Photonics, Inc., West Hills, CA (US)

(72) Inventors: Qiugui Zhou, West Hills, CA (US); Mark Heimbuch, West Hills, CA (US)

(73) Assignee: Source Photonics, Inc., West Hills, CA (US)

( * ) Notice: Subject to any disclaimer, the term of this patent is extended or adjusted under 35 U.S.C. 154(b) by 497 days.

(21) Appl. No.: 16/343,991

(22) PCT Filed: Apr. 19, 2019

(86) PCT No.: PCT/US2019/028254
§ 371 (c)(1),
(2) Date: Apr. 22, 2019

(87) PCT Pub. No.: WO2020/214184
PCT Pub. Date: Oct. 22, 2020

(65) Prior Publication Data
US 2021/0373363 A1 Dec. 2, 2021

(51) Int. Cl.
*G02F 1/035* (2006.01)
*G02F 1/025* (2006.01)
*G02F 1/015* (2006.01)

(52) U.S. Cl.
CPC .......... *G02F 1/025* (2013.01); *G02F 1/0151* (2021.01); *G02F 2201/063* (2013.01)

(58) Field of Classification Search
CPC ... G02F 1/025; G02F 1/0151; G02F 2201/063
See application file for complete search history.

(56) References Cited

U.S. PATENT DOCUMENTS

| | | | |
|---|---|---|---|
| 7,251,408 B1 | 7/2007 | Gunn, III et al. | |
| 9,343,638 B2 | 5/2016 | Gardes et al. | |
| 9,470,914 B1 | 10/2016 | Djordjevic et al. | |
| 10,151,941 B2 * | 12/2018 | Ishikura | G02F 1/025 |

(Continued)

OTHER PUBLICATIONS

International Search Report and Written Opinion; PCT International Searching Authority/US dated Jul. 17, 2019; International Application No. PCT/US2019/028254; 8 pages; International Searching Authority/United States, Commissioner for Patents; Alexandria, Virginia.

(Continued)

*Primary Examiner* — Ellen E Kim
(74) *Attorney, Agent, or Firm* — Central California IP Group, P.C.; Andrew D. Fortney

(57) ABSTRACT

An optical phase shifter and a method of making the same are disclosed. The phase shifter includes a substrate, a p-doped electrode and an n-doped electrode on the substrate, a first doped semiconductor layer on the p-doped electrode or the n-doped electrode and in electrical contact with the other electrode, a second doped semiconductor layer on the first doped semiconductor layer, a first vertical region electrically connecting the second doped semiconductor layer with the one electrode, and a cladding layer on or over the second semiconductor layer, the first vertical region, and at least a first sidewall of each of the first and second semiconductor layers. The p-doped electrode and the n-doped electrode form a p-n junction at an interface therebetween. The first and second doped semiconductor layers have the same doping type as the other electrode and the one electrode, respectively.

20 Claims, 17 Drawing Sheets

(56) References Cited

U.S. PATENT DOCUMENTS

| | | | |
|---|---|---|---|
| 2006/0045522 A1 | 3/2006 | Gill et al. | |
| 2007/0031080 A1 | 2/2007 | Liu | |
| 2011/0176762 A1* | 7/2011 | Fujikata | G02F 1/025 385/2 |
| 2012/0070111 A1 | 3/2012 | Shin et al. | |
| 2013/0188902 A1 | 7/2013 | Gardes et al. | |
| 2014/0233878 A1* | 8/2014 | Goi | G02F 1/025 385/3 |
| 2016/0313577 A1* | 10/2016 | Sun | G02F 1/025 |
| 2017/0299902 A1* | 10/2017 | Yu | G02B 6/1228 |
| 2018/0143464 A1 | 5/2018 | Baehr-Jones et al. | |

OTHER PUBLICATIONS

Koji Yamada; "Silicon Photonic Wire Waveguides: Fundamentals and Applications"; Silicon Photonics II; Topics in Applied Physics 119; 2011; pp. 1-29; http://www.springer.com.

"Silicon Photonics"; Wikipedia; Oct. 26, 2018; 12 pages; https://en.wikipedia.org.

Mackenzie A. Van Camp et al.; "Demonstration of Electrooptic Modulation at 2165nm Using a Silicon Mach-Zehnder Interferometer"; Dec. 17, 2012; pp. 28009-28016; vol. 2, No. 27; Optics Express.

Ansheng Liu et al.; "High-Speed Optical Modulation Based on Carrier Depletion in a Silicon Waveguide"; Jan. 22, 2007; pp. 660-668; vol. 15, No. 2; Optics Express.

Steven J. Spector et al.; "Operation and Optimization of Silicon-Diode-Based Optical Modulators"; Jan./Feb. 2010; pp. 165-171; vol. 16, No. 1; IEEE Journal of Selected Topics in Quantum Electronics.

* cited by examiner

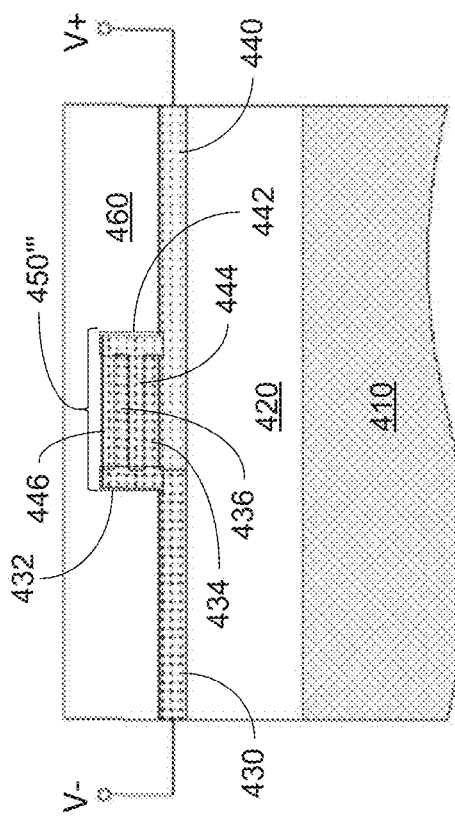
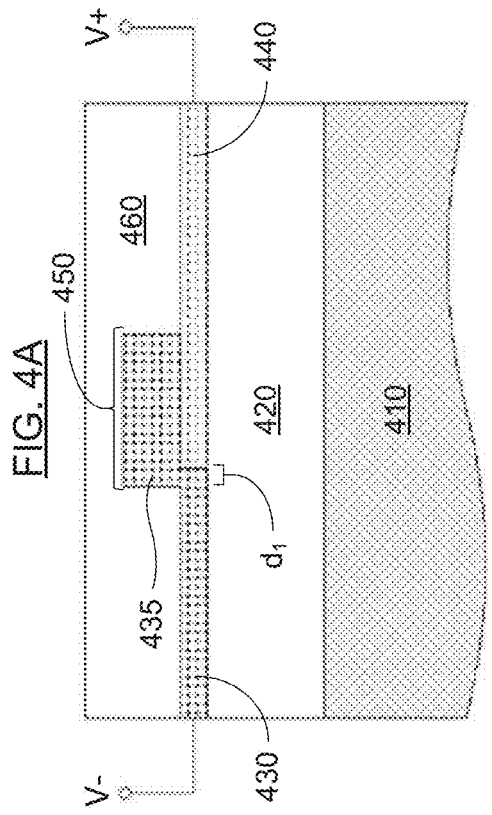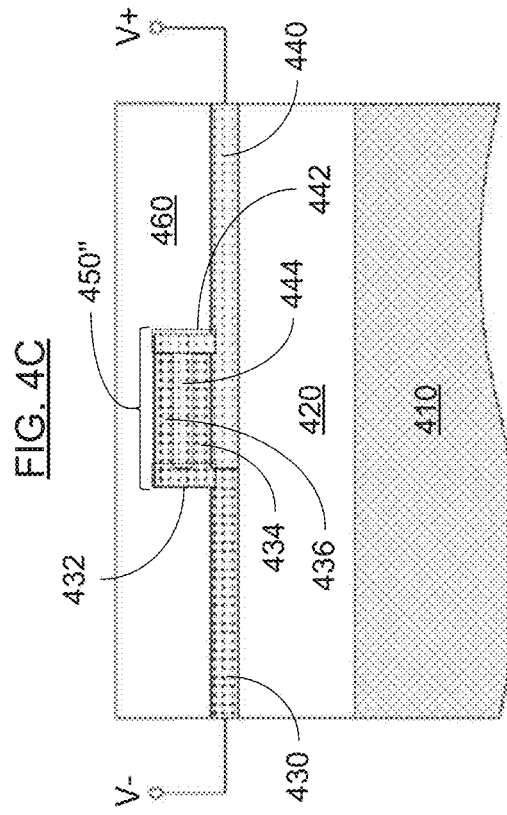

| Unit | Unit length phase shift (0~-1V) | Unit length loss (-0.5 V) | Length (2VVπ) | Loss (2VVπ) |
|---|---|---|---|---|
| | π/cm | dB/cm | cm | dB |
| pn | 2.81 | 46.2 | 0.178 | 8.22 |
| npn | 4.67 | 39.7 | 0.107 | 4.25 |
| pnpn | 5.98 | 31.6 | 0.084 | 2.64 |
| npnpn | 7.04 | 23.5 | 0.071 | 1.67 |

MULTI-LAYER P-N JUNCTION BASED PHASE SHIFTER AND METHODS OF MANUFACTURING AND USING THE SAME

FIELD OF THE INVENTION

The present invention relates to the field of photonics, and particularly to optical phase shifters for use in light modulators, optical or optoelectronic transmitters and receivers, optical networks and optical communications equipment.

DISCUSSION OF THE BACKGROUND

Optical or optoelectronic transceivers (which may be generally identified as "optical transceivers") convert electrical signals into optical signals and optical signals into electrical signals. An optical transceiver may include receiver and transmitter optical subassemblies, functional circuits, and electrical and optical interfaces, and are significant components in optical fiber communication systems and data storage networks.

A transmitter optical subassembly (TOSA) may include a laser diode configured to output a continuous light beam. The continuous light beam is modulated to carry a data signal thereon. One way to modulate the light beam is to modulate the current driving the light source (e.g., a laser diode). This type of modulation is called direct modulation, as opposed to external modulation (e.g., as is performed by an optical modulator).

In fiber optic communications, laser diodes emitting light having a narrow linewidth are often used. However, direct modulation of such laser diodes may be undesirable due to high-bandwidth "chirping" that can occur when applying the current to and removing the current from the laser.

External modulators may be electrical or optical. Depending on the parameter of the light beam that is modulated, optical modulators may be categorized as amplitude modulators, phase modulators, or polarization modulators, among other types. Phase modulation (PM) is a modulation pattern that encodes information as variations in the instantaneous phase of a carrier wave. Some phase modulators may modulate the continuous light beam by applying a radio frequency (RF) signal to the continuous light beam. The phase of a carrier signal is modulated to follow the changing voltage level (amplitude) of an electrical modulation signal provided to the RF signal source. The peak amplitude and frequency of the carrier signal remain constant, but as the amplitude of the electrical information signal changes, the phase of the carrier changes correspondingly. The voltage for inducing a phase change of n is called the half-wave voltage.

A phase modulator can also be used as an amplitude modulator by using a Mach-Zehnder interferometer. In a Mach-Zehnder interferometer, a beam splitter divides the laser light into two paths, at least one of which has a phase modulator as described above. The beams are then recombined after at least one beam is modulated. Changing the electric field on the phase-modulating path determines whether the two beams interfere constructively or destructively at the output, thereby controlling the amplitude or intensity of the modulated light. This device may also be called a Mach-Zehnder modulator.

A phase modulator may comprise a plurality of waveguides and phase shifters connected to one or more optical couplers. The waveguides within the phase shifters may include a junction having a p-doped region on one side and an n-doped region on another side, such that the difference in refractive indices between the n-doped and p-doped regions allows an optical signal to propagate in a desired direction with minimal energy loss. Examples of such phase shifters are disclosed in U.S. Pat. Nos. 9,470,914 and 9,343,638, and in U.S. Pat. Appl. Publ. No. 2018/0143464, among others.

A cross-section of a conventional phase shifter 100 is shown in FIG. 1A. The conventional phase shifter 100 may comprise a substrate layer 110, a first insulator layer 120, a p-doped semiconductor 130 including a p-doped region 132 and a p-doped electrode 134, an n-doped semiconductor 140 including an n-doped region 142 and an n-doped electrode 144, and a second insulator layer 150. An electric field (e.g., RF signal) is applied across the terminals V+ and V− to shift the phase of the optical signal passing through the phase shifter 100.

A top-down view of the same conventional phase shifter is shown in FIG. 1B. The p-doped and n-doped electrodes 132 and 142 function for injecting carriers when a voltage is applied to the phase shifter. The p-doped and n-doped regions 134 and 144 form a p-n junction in the rib 160. The rib 160 corresponds to the p-doped region 132 and n-doped region 142 in FIG. 1A. A p-n junction 165 is formed at the interface between the p-doped semiconductor 130 and the n-doped semiconductor 140. The insulator layers 120 and 150 have a lower refractive index than the p-doped region 132 and the n-doped region 142, and function as waveguide cladding outside the phase shifter 100.

FIG. 2 is a cross-sectional view of a model for the conventional phase shifter 100, comprising the p-doped electrode 132, the p-doped region 134, the n-doped electrode 142, the n-doped region 144, and the p-n junction 165 between the p-doped and the n-doped regions 134 and 144. A key 200 shows the level of n-type dopant and p-type dopant within each component. When an electric field is applied across the phase shifter 200 (e.g., at the p-doped and n-doped electrodes 132 and 142), the refractive index of the doped semiconductor material near the p-n junction 165 changes, and the phase of the light passing through the rib 160 changes correspondingly. However, the p-n junction 165 consumes only a small part of the rib 160, and much of the rib 160 is optically inactive (e.g., does not carry an optical signal).

FIG. 3A is a graph 300A showing the variation of the capacitances $C_p$ and $C_n$ (in pF/cm) as the voltage applied across the phase shifter 200 changes. The capacitances $C_p$ and $C_n$ are the respective capacitances across the p-n junction of the phase shifter 200 when the voltage is applied to the p-doped electrode 132 and the n-doped electrode 142, respectively, while the other electrode is held at a ground potential. It is desirable for the curve 310 (representing $C_n$) and the curve 320 (representing $C_p$) to overlap perfectly or substantially perfectly, as slight variations may result in or correspond to considerable adverse effects in the optical signal propagating through the rib 160 near the p-n junction 165. The curves 310 and 320 are nonlinear, and the capacitances $C_p$ and $C_n$ increase slightly exponentially as the voltage increases.

FIG. 3B is a graph 300B showing the insertion loss (in dB/cm) as the voltage applied to the phase shifter 200 changes. At 0 V, the insertion loss is about 27 dB/cm, at −1 V, the insertion loss is about 24.7 dB/cm, and at −4 V, the insertion loss is about 21.2 dB/cm. The curve 330 is nonlinear between 0 V and −1 V, but substantially linear in the range of −1 V to −4 V. The insertion loss decreases at a rate of about 1.2 dB/cm per volt in the range −1 V to −4 V.

FIG. 3C is a graph 300C showing the variation of the 1 cm phase change (in π/cm) as the voltage across the phase shifter 200 changes. The "1 cm phase change" is the amount of phase change that occurs in 1 cm of the phase shifter 200 at the applied voltage. At −4 V, the phase change is about 3.5 π/cm, and at 0 V, the phase change is 0 π/cm. The curve 340 is substantially linear in the range of −4 V to −1 V, but nonlinear between −1 V and 0 V. The phase change per cm decreases by about 0.4n per V as the voltage increases in the range of −4 V to −1 V.

Over the range of 0 V to about −2 V, the conventional phase shifter 100 in FIG. 2 has a $V_\pi L$ of 0.95 V·cm, an insertion loss of 25 dB/cm at −1 V, a capacitance of 3.7 pF/cm at −1 V, and a $V_\pi$Loss of 24 V·dB.

Photonic waveguides can be formed in semiconductor and other materials when adjacent materials have different refractive indices. For example, a core containing elemental silicon (e.g., doped or undoped amorphous, polycrystalline or single-crystal silicon) such as the fin region 160 (FIG. 1B) has a higher refractive index than the doped or undoped insulator cladding (e.g., glass layers 120 and 150 in FIG. 1A) surrounding it. This creates a barrier to transmission of light from the structure containing elemental silicon to the surrounding insulator layers, and vice versa.

Depending on the number of carriers and the dopant type, active photonic devices such as modulators and phase shifters can be formed in semiconductors (especially crystalline semiconductors). For example, such active devices may comprise p-doped and n-doped regions in the semiconductor with a junction region between the p-doped and n-doped regions. Due to the carrier dispersion effect, the refractive index of the doped semiconductor regions in such active photonic devices changes when an electric field is applied across the doped semiconductor regions, resulting in light passing through the doped semiconductor regions at a different speed, and enabling a phase shift in the light.

Although the aforementioned conventional phase shifters 100 and 400 may shift the phase of an optical signal to a desirable degree, they may also cause appreciable insertion loss, and appreciable real estate in the rib region is essentially unused. In addition, when the waveguides or phase shifter(s) have a certain size, the wavelength or frequency of the light passing through the waveguide or phase shifter can affect the performance of the waveguide(s) or phase shifter(s). Furthermore, there is a need to shrink optical components such as phase shifters and modulators to fit in the limited space of a TOSA (e.g., in a standardized package).

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention advantageously solves the above problems by stacking alternating p- and n-doped layers in the rib region of the phase shifter and electrically connecting the overlying doped layers with the corresponding p- or n-doped electrode, thereby extending the length of the p-n interface in the rib region of the phase shifter. Accordingly, in one aspect, the present invention relates to an optical phase shifter comprising a substrate, a p-doped electrode and an n-doped electrode on the substrate, a first doped semiconductor layer on one of the p-doped electrode and the n-doped electrode and in electrical contact with the other of the p-doped electrode and the n-doped electrode, a second doped semiconductor layer on the first doped semiconductor layer, a third doped semiconductor layer on the second doped semiconductor layer, a first vertical region electrically connecting the second doped semiconductor layer with the one of the p-doped electrode and the n-doped electrode, and a second vertical region electrically connecting the third doped semiconductor layer with the other of the p-doped electrode and the n-doped electrode. The p-doped electrode and the n-doped electrode form a p-n junction at an interface therebetween. Consequently, the p-doped electrode and the n-doped electrode may contact each other and/or be in a continuous semiconductor layer. The first and third doped semiconductor layers have the same doping type as the other of the p-doped electrode and the n-doped electrode, and the second doped semiconductor layer has the same doping type as the one of the p-doped electrode and the n-doped electrode.

In some embodiments, the first vertical region may be along a sidewall of the first doped semiconductor layer, and the second vertical region is along a sidewall of the second doped semiconductor layer. The sidewall of the first doped semiconductor layer may be opposite from the sidewall of the second doped semiconductor layer (e.g., the sidewalls of the first and second doped semiconductor layers may be on opposite sides of the stack of doped semiconductor layers).

In further embodiments, the optical phase shifter comprises a cladding layer on or over an uppermost surface of the second semiconductor layer, the first vertical region, and optionally, on at least a first sidewall of each of the first, second and third semiconductor layers.

In even further embodiments, the optical phase shifter further comprises a fourth doped semiconductor layer on the third doped semiconductor layer. The fourth doped semiconductor layer may have the same doping type as the one of the p-doped electrode and the n-doped electrode. The first vertical region may electrically connect the fourth doped semiconductor layer with at least one of (and, in some embodiments, both of) the second doped semiconductor layer and the one of the p-doped electrode and the n-doped electrode.

In some embodiments, the first doped semiconductor layer is on the n-doped electrode, is in electrical contact with the p-doped electrode, and/or has the same doping type as the p-doped electrode. In other or further embodiments, the second doped semiconductor layer and the first vertical region may have the same doping type as the n-doped electrode.

In various embodiments, the p-doped electrode, the n-doped electrode, the first doped semiconductor layer, and the second doped semiconductor layer may independently comprise a monocrystalline or polycrystalline semiconductor, such as silicon, germanium, SiGe, a Group III-V semiconductor, a Group II-VI semiconductor, or a combination or mixture thereof.

In other or further embodiments, the substrate may comprise a crystalline semiconductor substrate. For example, the crystalline semiconductor substrate may comprise Si, SiGe, Ge, GaAs, InP, GaP, GaN, ZnO, ZnS, ZnSe, CdO, CdS, CdSe, CdTe, or a combination or mixture thereof. In such embodiments, the substrate may further comprise a first insulator layer, and the p-doped electrode and the n-doped electrode may be on the first insulator layer. The first insulator layer may comprise silicon dioxide, silicon nitride or silicon oxynitride. Thus, the substrate may comprise a silicon-on-insulator substrate, and the p-doped electrode and the n-doped electrode may be on the insulator of the silicon-on-insulator substrate.

In various embodiments, the cladding layer may comprise silicon dioxide, silicon nitride, silicon oxynitride, or a combination thereof. In other or further embodiments, the cladding layer may have a planar uppermost surface (e.g., the surface farthest away from the substrate).

Another aspect of the present invention relates to a method of making an optical phase shifter, comprising forming a p-doped electrode and an n-doped electrode on a substrate such that the p-doped electrode and the n-doped electrode form a p-n junction at an interface therebetween, forming a first patterned insulator layer over the p-doped electrode and the n-doped electrode, forming a first doped semiconductor layer in the first trench, opening, or cavity, forming a second doped semiconductor layer on the first doped semiconductor layer in the first trench, opening, or cavity, forming a second patterned insulator layer on the first and second doped semiconductor layers and the p-doped and n-doped electrodes, forming a first vertical region in or through the second trench, opening, or cavity, and forming a cladding layer on or over an uppermost surface of the second semiconductor layer, the first vertical region, and on at least one sidewall of each of the first and second semiconductor layers. The first patterned insulator layer has a first trench, opening, or cavity (i) exposing the p-n junction at the interface between the p-doped electrode and the n-doped electrode or (ii) with a first sidewall substantially aligned with the interface between the p-doped electrode and the n-doped electrode. The first doped semiconductor layer is on at least one of the p-doped electrode and the n-doped electrode and has the same doping type as the other of the p-doped electrode and the n-doped electrode. The second doped semiconductor layer has the same doping type as the one of the p-doped electrode and the n-doped electrode. The second patterned insulator layer has a second trench, opening, or cavity exposing at least part of the second doped semiconductor layer. The first vertical region electrically connects the second doped semiconductor layer with the one of the p-doped electrode and the n-doped electrode.

In various embodiments of the method, forming the second patterned insulator layer may comprise expanding the first trench, opening, or cavity in the first patterned insulator layer to expose one sidewall of the first and second semiconductor layers and a part of the one electrode adjacent to the one sidewall of the first and second semiconductor layers, and forming the first vertical region may comprise growing the first vertical region in the second trench, opening, or cavity on the one sidewall of the first and second semiconductor layers and the adjacent part of the one electrode. Alternatively, forming the second patterned insulator layer may comprise (i) removing the first patterned insulator layer, (ii) blanket-depositing an insulator material on the first and second doped semiconductor layers and the p-doped and n-doped electrodes, and (iii) forming the second trench, opening, or cavity in the insulator material to expose one sidewall of the first and second semiconductor layers and a part of the one electrode adjacent to the one sidewall, and forming the first vertical region may comprise growing the first vertical region in the second trench, opening, or cavity on the one sidewall and the adjacent part of the one electrode. In a further alternative, forming the second patterned insulator layer may comprise (i) removing the first patterned insulator layer, (ii) blanket-depositing an insulator material on the first and second doped semiconductor layers and the p-doped and n-doped electrodes, and (iii) forming the second trench, opening, or cavity in the insulator material to expose a region of the second semiconductor layer over the one electrode adjacent to one sidewall of the first and second semiconductor layers, and forming the first vertical region may comprise implanting a first dopant through the second trench, opening, or cavity into (a) the exposed region of the second semiconductor layer and (b) at least an underlying part of the first semiconductor layer. In such a further alternative, the first dopant has the same dopant type as the one electrode.

As for the optical phase shifter, in some embodiments, the substrate may comprise a first insulator layer and a semiconductor layer on the first insulator layer, and the p-doped electrode and the n-doped electrode may be formed in the semiconductor layer. In other or further embodiments, forming the first and second doped semiconductor layers may comprise epitaxially growing the first and second doped semiconductor layers sequentially in the first trench, opening, or cavity.

In some embodiments, forming the p-doped electrode and the n-doped electrode may comprise implanting a p-type dopant through a first mask over a first region in the semiconductor layer corresponding to the n-doped electrode, and implanting an n-type dopant through a second mask over a second region in the semiconductor layer corresponding to the p-doped electrode. These implanting steps may be performed in either order, and may further comprise forming the first mask over the first region prior to implanting the p-type dopant and forming the second mask over the second region prior to implanting the n-type dopant.

In some embodiments, the method may further comprise forming a third doped semiconductor layer on the second doped semiconductor layer, and forming a second vertical region electrically connecting the third doped semiconductor layer with the other of the p-doped electrode and the n-doped electrode. The third doped semiconductor layer may have the same doping type as the other of the p-doped electrode and the n-doped electrode. In further embodiments, the second vertical region may be along a second sidewall of the second doped semiconductor layer. The second sidewall of the second doped semiconductor layer may be one of the first sidewall(s) of the second doped semiconductor layer, or may be opposite from one of the first sidewall(s) of the second doped semiconductor layer.

In even further embodiments, the method may further comprise forming a fourth doped semiconductor layer on the third doped semiconductor layer. The fourth doped semiconductor layer may have the same doping type as the one p-doped or n-doped electrode. In such embodiments, the first vertical region electrically connects the fourth doped semiconductor layer with the one p-doped or n-doped electrode.

In some embodiments, as for the present optical phase shifter, the first doped semiconductor layer may be on the n-doped electrode and/or in electrical contact with the p-doped electrode, and/or may have the same doping type as the p-doped electrode. In further embodiments, the second doped semiconductor layer and the first vertical region have the same doping type as the n-doped electrode.

In some embodiments of the present method, forming the cladding layer may comprise depositing a second insulator layer on the second patterned insulator layer sufficient to fill the second trench, opening, or cavity, and planarizing the second insulator layer. Alternatively, forming the cladding layer may comprise removing the second patterned insulator layer, blanket-depositing a second insulator layer on the first and second semiconductor layers and the p-doped and n-doped electrodes, and planarizing the second insulator layer. In this alternative, the second insulator layer may have a thickness greater than a combined height of the first and second (and, if present, the third and fourth) semiconductor layers.

The present phase shifter reduces insertion loss, uses the material(s) in the rib region of the phase shifter to a greater extent for carrying optical signals, and reduces the size of the optical phase shifter and components including the optical phase shifter (e.g., optical modulators). Reducing the size of the optical phase shifter enables design of higher-speed devices and/or greater functionality in optical devices such as optical transmitters and/or receivers including the optical phase shifter. Reducing the size of the optical phase shifter to less than $\lambda/10$ (where $\lambda$ is the wavelength of the light passing through the phase shifter), which the present invention also enables, generally renders the performance of the phase shifter independent of the wavelength of the light.

These and other features and advantages of the present invention will become readily apparent from the detailed description of various embodiments below.

BRIEF DESCRIPTION OF THE DRAWINGS

FIGS. 4A-D show cross-sections of exemplary phase shifters having stacked, alternating p-doped and n-doped semiconductor layers in accordance with embodiments of the present invention.

DETAILED DESCRIPTION

Figure 1A:
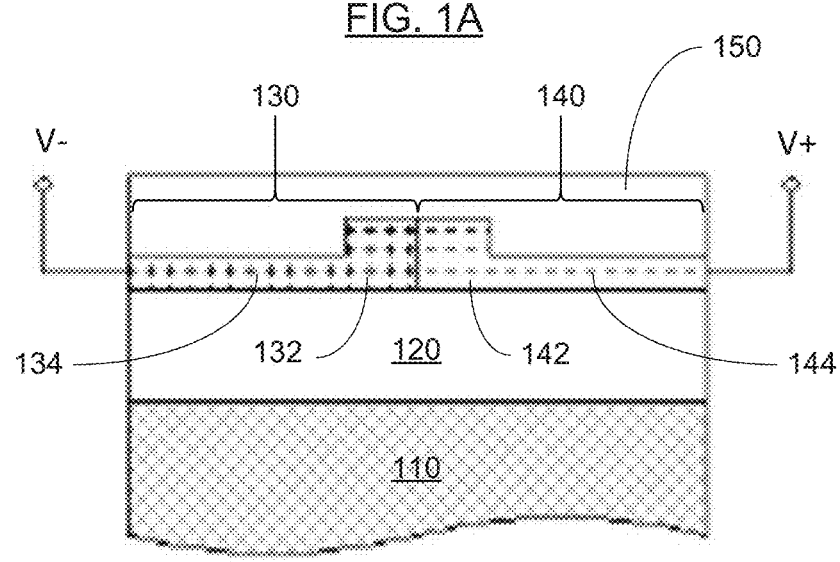
FIG. 1A shows a cross-section of a conventional phase shifter.
Figure 1B:
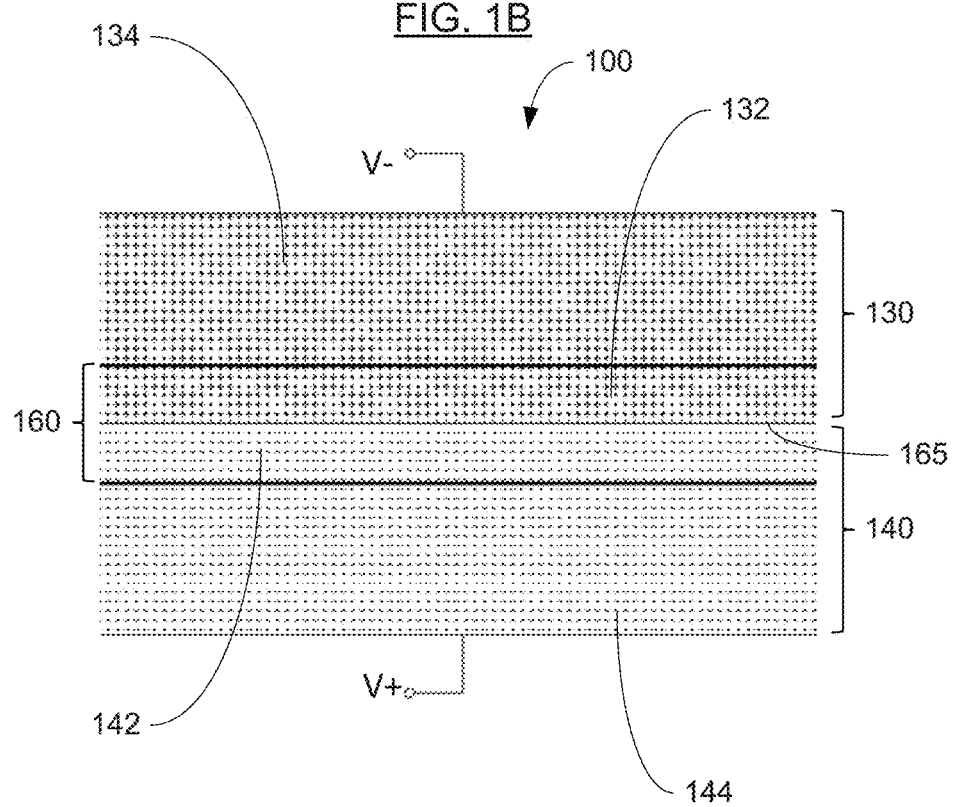
FIG. 1B shows a top-down view of a conventional phase shifter shown in FIG. 1A.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

For the sake of convenience and simplicity, the terms "transceiver," "optical transceiver" and "optoelectronic transceiver" may be used interchangeably, as may the terms "optical" and "optoelectronic," the terms "connected to," "coupled with," "coupled to," and "in communication with" (which include both direct and indirect connections, couplings and communications), the terms "mounting," "affixing," "attaching" and "securing" (and grammatical variations thereof), the terms "data," "information" and "bit(s)," and the terms "package," "housing," "assembly," and "subassembly," but these terms are generally given their art-recognized meanings. The term "(sub)assembly" refers to an assembly and/or subassembly. While the term "electrode" typically refers to a conductive metal structure in a device, herein it also refers to doped semiconductor structures that can function as a wire or a conductive plate in an electronic or optoelectronic device.

The term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases (e.g., cylindrical structures such as optical fibers and certain other optical waveguides). A "major surface" refers to a surface defined by the two largest dimensions of a given structure or feature, which in the case of a structure or feature having a partially or completely circular or spherical surface, may be defined by the radius of the circle or sphere.

FIGS. 4A-D are cross-sections of exemplary phase shifters having multiple stacked, alternating p-doped and n-doped semiconductor layers in a rib region 450. Each of the phase shifters includes a substrate 410, a first insulator layer 420, a p-doped electrode 430, an n-doped electrode 440, a rib region 450, and a second insulator layer 460. The p-n interface in the rib region 450 forms a waveguide core. The structure in the rib region 450 varies among the phase shifters. Otherwise, the components are the same or substantially the same among them.

The substrate 410 may comprise a crystalline semiconductor substrate. For example, the substrate 410 may comprise a Group IV semiconductor, such as silicon, SiGe, or Ge; a III-V semiconductor, such as GaAs, InP, GaP, GaN, or a combination or mixture thereof; a II-VI semiconductor, such as ZnO, ZnS, ZnSe, CdO, CdS, CdSe, CdTe, or a combination or mixture thereof; etc. Any of the semiconductor substrates 410 (except for those consisting or consisting essentially of one or more III-V semiconductors) may be conventionally doped with one or more Group III or Group V dopants. The first insulator layer 420 may comprise an insulator such as silicon dioxide.

The p-doped electrode 430 may comprise a monocrystalline or polycrystalline semiconductor such as silicon doped with, e.g., boron and/or gallium. The n-doped electrode 440 may comprise a monocrystalline or polycrystalline semiconductor such as silicon doped with, e.g., phosphorus and/or arsenic. The p-doped and n-doped electrodes 430 and 440 function as electrodes in the phase shifter, similar or identical to the electrodes 134 and 144 in FIG. 1A. The combination of the substrate 410, the first insulator layer 420, and (prior to doping) the p-doped electrode 430 and the n-doped electrode 440 may comprise a conventional silicon-on-insulator (SOI) wafer.

The second insulator layer 460 may comprise an insulator such as silicon dioxide, silicon nitride or silicon oxynitride. An electric field (e.g., RF signal) is applied across the terminals V+ and V− (e.g., through metal contacts [not shown] in the second insulator layer 460) to shift the phase of the optical signal passing through the waveguide core in the rib region 450.

The p-doped and n-doped electrodes 430 and 440 may each have a thickness of from 0.01 to 2 µm (e.g., 0.1-1 µm, or any thickness or range of thicknesses between 0.01 and 2 µm). The second insulator layer 460 may have a thickness of from 0.05 to 1 µm (e.g., 0.1-0.5 µm, or any thickness or range of thicknesses between 0.05 and 1 µm). The rib region 450 may have a thickness of from 0.2 to 5 µm (e.g., 0.5-2.5 µm, or any thickness or range of thicknesses between 0.2 and 5 µm) and a width of from 0.4 to 2 µm (e.g., 0.5-1 µm, or any width or range of widths between 0.4 and 2 µm). The p-doped and n-doped electrodes 430 and 440 may be doped at a dosage of from $10^{16}$ to $10^{19}$ cm$^{-2}$ (e.g., $10^{17}$ to $5*10^{18}$ cm$^{-2}$ or any other dosage or range of dosages between $10^{16}$ and $10^{18}$ cm$^{-2}$) of dopant.

The phase shifter shown in FIG. 4A includes a single p-doped semiconductor layer 435 over the parts of the p-doped electrode 430 and the n-doped electrode 440 in the rib region 450. The width of the p-doped layer 435 is greater than the sum or combination of (i) the height of the p-doped electrode 430 and/or the n-doped electrode 440 and (ii) the distance di (i.e., the width of the connection between the p-doped electrode 430 and the p-doped layer 435). Typically, the height of the p-doped electrode 430 equals the height of the n-doped electrode 440, but the invention is not limited thereto. In some embodiments, the distance di is equal to the height of the p-doped electrode 430 and/or the n-doped electrode 440, ±50% (or any value or range of values within ±50%). Therefore, the length of the p-n interface in the phase shifter of FIG. 4A is greater than the length of the p-n interface in the phase shifter of FIG. 1A, assuming the dimensions of and the dopant doses in the electrodes and the rib region are identical in both phase shifters.

FIG. 4B shows another phase shifter in which the rib region 450' includes part of the n-doped electrode 440, a p-doped vertical region 432, a first p-doped layer 434, an n-doped vertical region 442, and a first n-doped layer 444. The rib region 450' has a "npn" stack or configuration, with the first p-doped layer 434 on the n-doped electrode 440, and the first n-doped layer 444 on the first p-doped layer 434. In some alternative embodiments, the n-doped layer 444 extends across the entire width of the rib region 450', and the p-doped vertical region 432 is absent (similar to the p-doped layer 435 in the phase shifter of FIG. 4A).

Each of the p-doped layer 434 and the n-doped layer 444 may have a thickness or depth of from 0.1 to 2 µm (e.g., 0.7-1.5 µm, or any thickness or range of thicknesses between 0.1 and 2 µm) and may be doped with a dose of from $10^{16}$ to $10^{19}$ cm$^{-2}$ (e.g., $10^{17}$ to $5*10^{18}$ cm$^{-2}$ or any other dosage or range of dosages between $10^{16}$ and $10^{18}$ cm$^{-2}$) of dopant. However, in some embodiments, the p-doped layer 434 is doped with a higher dose of dopant than the n-doped region 440, and the n-doped layer 444 is doped with a higher dose of dopant than the p-doped layer 434.

FIG. 4C shows yet another phase shifter in which the rib region 450" includes part of the n-doped electrode 440, the p-doped vertical region 432, the first p-doped layer 434, the n-doped vertical region 442, the first n-doped layer 444, and a second p-doped layer 436 over the first n-doped layer 444. The rib region 450" has a "pnpn" stack or configuration, with the first p-doped layer 434 on the n-doped electrode 440, the first n-doped layer 444 on the first p-doped layer 434, and the second p-doped layer 436 on the first n-doped layer 444. In some alternative embodiments, the second p-doped layer 436 extends across the entire width of the rib region 450", and the n-doped vertical region 442 extends only to the interface between the n-doped layer 444 and the second p-doped layer 436.

Each of the p-doped layers 434 and 436 and the n-doped layer 444 may have a thickness or depth of from 0.1 to 1.5 µm (e.g., 0.4-1 µm, or any thickness or range of thicknesses between 0.1 and 1.5 µm) and may be doped with the same or similar doses of dopant as the doped layers in the phase shifter of FIG. 4B. However, in some embodiments, the first p-doped layer 434 is doped with a higher dose of dopant than the n-doped region 440, the n-doped layer 444 is doped with a higher dose of dopant than the p-doped layer 434, and the second p-doped layer 436 is doped with a higher dose of dopant than the n-doped layer 444.

FIG. 4D shows still another phase shifter in which the rib region 450''' includes part of the n-doped electrode 440, the p-doped vertical region 432, the first p-doped layer 434, the n-doped vertical region 442, the first n-doped layer 444, the second p-doped layer 436, and a second n-doped layer 446. The rib region 450''' has a "npnpn" stack or configuration, with the first p-doped layer 434 on the n-doped electrode 440, the first n-doped layer 444 on the first p-doped layer 434, and the second p-doped layer 436 on the first n-doped layer 444, and the second n-doped layer 446 on the second p-doped layer 436. In some alternative embodiments, the second n-doped layer 446 extends across the entire width of the rib region 450", and the p-doped vertical region 432 extends only to the interface between the second p-doped layer 436 and the second n-doped layer 446.

Each of the p-doped layers 434 and 436 and the n-doped layers 444 and 446 may have a thickness of from 0.1 to 1 µm (e.g., 0.3-0.8 µm, or any thickness or range of thicknesses between 0.1 and 2 µm) and may be doped with the same or similar doses of dopant as the doped layers in the phase shifters of FIGS. 4B-C. However, in some embodiments, the first p-doped layer 434 is doped with a higher dose of dopant than the n-doped region 440, the n-doped layer 444 is doped with a higher dose of dopant than the p-doped layer 434, the second p-doped layer 436 is doped with a higher dose of dopant than the n-doped layer 444, and the second n-doped layer 446 is doped with a higher dose of dopant than the second p-doped layer 436.

Figures 5, 6:
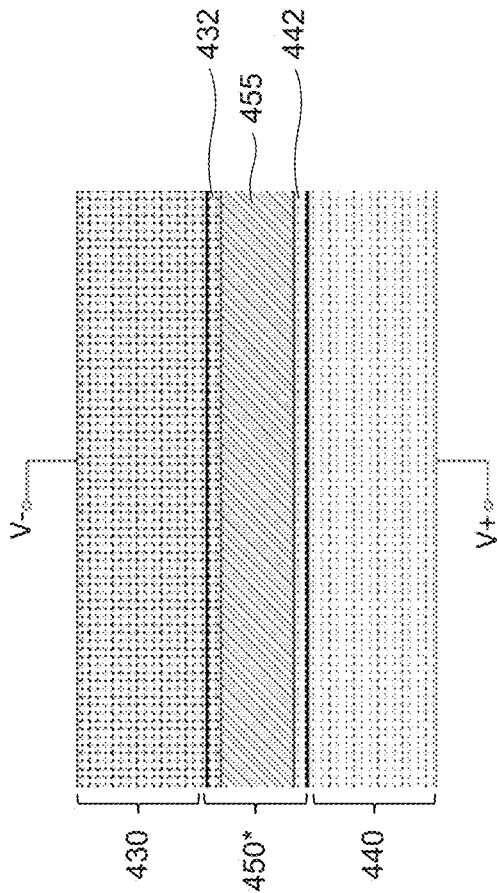
FIG. 5 is a top-down view of the phase shifters shown in FIGS. 4A-D.
FIG. 6 is a table comparing the phase shifters shown in FIGS. 4A-D, showing the capacitance, loss, phase shift per unit length, and length of the phase shifter, among other parameters.

FIG. 5 shows a top-down view of the phase shifters shown in FIGS. 4B-D, including the p-doped vertical region 432 and the n-doped vertical region 442, both of which are oriented vertically at the sides or lateral ends of the rib region 450*, and a stack region 455. The rib region 450* may be the rib region 450, 450', 450" or 450''', since the stack region 455 varies among the different phase shifters (see the previous descriptions of FIGS. 4A-D). The p-doped vertical region 432 and the n-doped vertical region 442 may each have a width of from 0.02 to 1 µm (e.g., 0.05-0.4 µm, 0.1-0.25 µm, or any other width or range of widths within the range 0.02 to 1 µm).

The p-doped layers 432, 434 and 436 and the n-doped layers 440, 442, 444 and 446 form an interlaced comb of alternating p and n layers that advantageously (i) increases the length of the p-n interface forming the core, (ii) decreases the insertion loss of an optical signal travelling through the core, and (iii) decreases the area and/or space of the phase shifter in the TOSA. The phase shifter shown in FIG. 4A has a "pn" stack or configuration (because the p-doped layer 435 resides over the n-doped region 440). Likewise, the phase shifter of FIG. 4B has a "npn" stack or configuration, the phase shifter of FIG. 4C has a "pnpn" stack or configuration, and the phase shifter of FIG. 4D has an "npnpn" stack or configuration, although the complementary configurations (i.e., "np," "npn," "npnp" and "npnpn") are also suitable.

Compared to the phase shifter of FIG. 4B, the phase shifter of FIG. 4C has one additional layer (the p-doped layer 434), and the phase shifter of FIG. 4D has two additional layers (the p-doped layer 434 and the n-doped layer 444). In further embodiments, any of the phase shifters shown in FIGS. 4A-D may have additional layers. For example, FIG. 4D may have an additional p-doped layer on the n-doped layer 446 so that the rib region 450''' has a "pnpnpn" stack or configuration.

FIG. 6 is a table showing the results of testing the "pn," "npn," "pnpn," and "npnpn" stacks or configurations of the phase shifters shown in FIGS. 4A-D. The parameters include phase shift per unit length as the voltage applied to the phase shifter changes from 0 to −1 V (or vice versa; in π/cm), the insertion loss per unit length at an applied voltage of −0.5 V (in dB/cm), the length of a modulator (in cm) comprising two of the phase shifters (in parallel) sufficient to provide a phase change of π radians in the light passing through the modulator at an applied voltage of 1 V on each phase shifter ("Length 2VVπ"), and the carrier absorption loss of a modulator (in dB) comprising two of the phase shifters that shifts the phase of the light passing through it by π radians at an applied voltage of 1 V on each phase shifter ("Loss 2VVπ"). As the number of layers in the alternating n-doped/p-doped stack increases, the phase shift per unit length increases, the insertion loss per unit length decreases, and the efficiency of the phase shifter increases. The "npnpn" stack or configuration most advantageously minimizes (1) carrier absorption loss (1.67 dB) and (2) length sufficient to provide a phase change of π radians at an applied voltage of 1 V (0.071 cm).

Figure 7A:
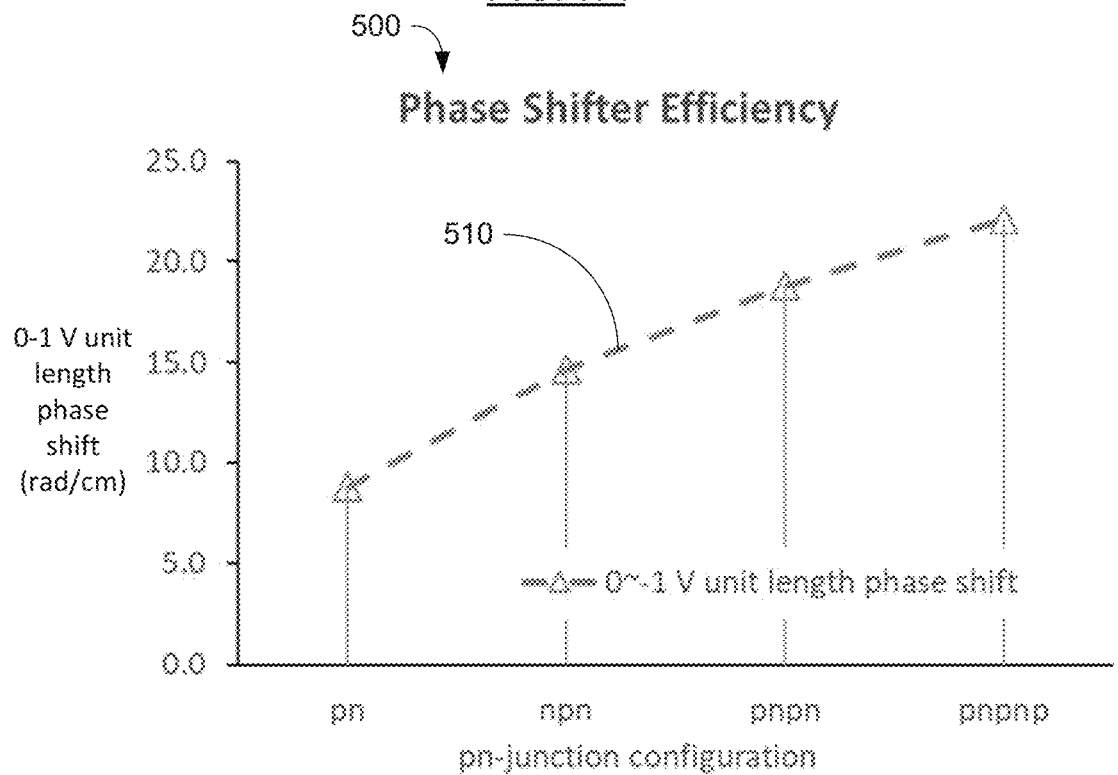
FIG. 7A is a graph comparing the efficiencies of the phase shifters shown in FIGS. 4A-D.
Figure 7B:
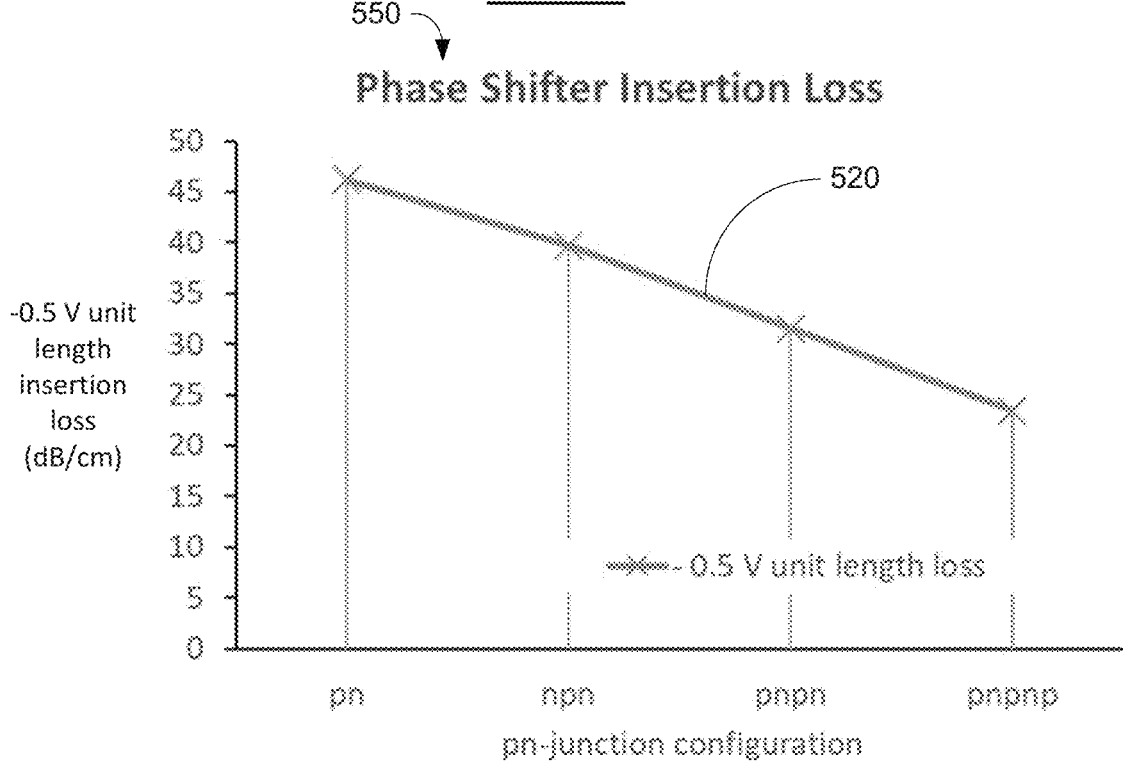
FIG. 7B is a graph comparing exemplary insertion losses of the phase shifters shown in FIGS. 4A-D.

FIGS. 7A and 7B are graphs 500 and 550 that respectively plot the values of the phase shift per unit length as the voltage changes from 0 to −1 V (in rad/cm) and the insertion loss per unit length at −0.5 V (in dB/cm) for each of phase shifters of FIGS. 4A-D. The phase shift per unit length increases and the insertion loss per unit length decreases as the number of layers in the rib region increases, as shown by the curves 510 and 520 in FIGS. 7A-B, respectively. The "npnpn" stack or configuration (equivalent to a "pnpnp" stack or configuration) had the highest phase shift per unit length (at 22.1 rad/cm) and the lowest insertion loss per unit length (at 23.5 dB/cm).

Figure 8:
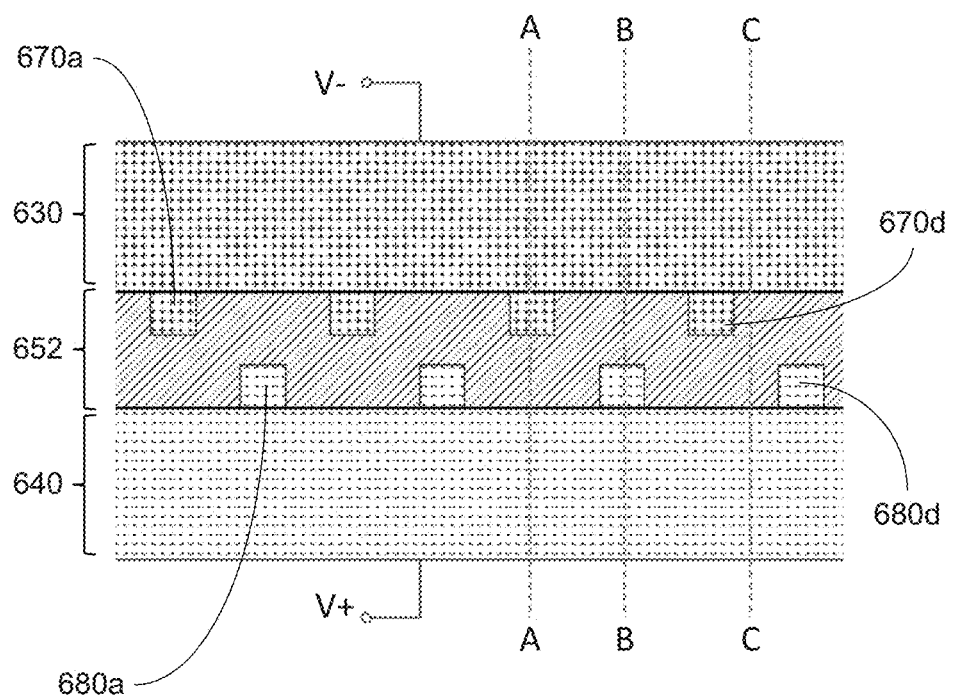
FIG. 8 is a top-down view of an exemplary alternative phase shifter having stacked, alternating p-doped and n-doped semiconductor layers in accordance with one or more embodiments of the present invention.

FIG. 8 is a top-down view of a phase shifter similar to the phase shifters shown in FIGS. 4A-D. P-doped pillars 670a-d and n-doped pillars 680a-d are alternatingly positioned along the length of the rib region 650. The p-doped pillars 670a-d are adjacent to the p-doped electrode 630, and the n-doped pillars 680a-d are adjacent to the n-doped electrode 640. The p-doped pillars 670a-d may be spaced evenly among the n-doped pillars 680a-d (i.e., adjacent p-doped pillars may be equidistant from an n-doped pillar between them), and the n-doped pillars 680a-d may be spaced evenly among the p-doped pillars 670a-d (i.e., adjacent n-doped pillars may be equidistant from a p-doped pillar between them). The p-doped pillars 670a-d and n-doped pillars 680a-d may be configured to further decrease insertion loss of an optical signal passing through the p-n junction region(s) and limit the size and/or area of the phase shifter in the TOSA.

The p-doped pillars 670a-d may comprise a semiconductor such as silicon doped with either boron or gallium, and may have a composition identical or substantially identical to that of the p-doped electrode 630 (although the dose or concentration of dopant may differ). The n-doped pillars 680a-d may comprise a semiconductor such as silicon doped with either phosphorus or arsenic, and may have a composition identical or substantially identical to that of the n-doped electrode 640 (although the dose or concentration of dopant may differ). Each of the p-doped pillars 670a-d and the n-doped pillars 680a-d may have a width of from 0.02 to 2 µm (e.g., 0.1-1 µm, or any width or range of widths between 0.02 and 2 µm), a length of from 1 to 15% of the length of the phase shifter (e.g., 5%, or any length or range of length between 1 and 15% of the length of the phase shifter), and a depth, height or thickness of either the height of the rib region 652 or the height of all of the p-doped and n-doped layers in the rib region 652 except the uppermost layer (e.g., when the uppermost layer has the complementary doping type).

Figure 9A:
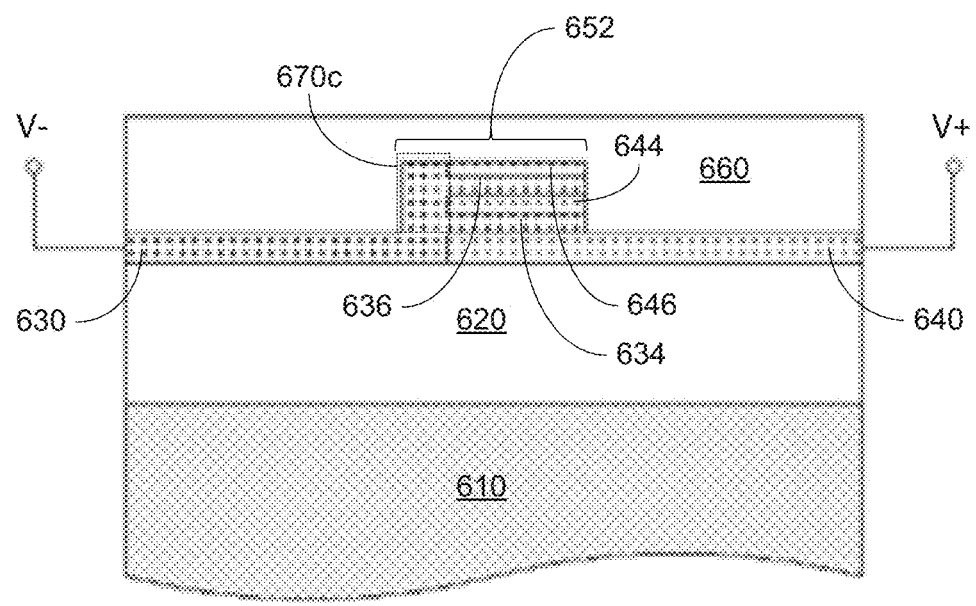
FIG. 9A shows a cross-section of the phase shifter shown in FIG. 8 along the line A-A.
Figure 9B:
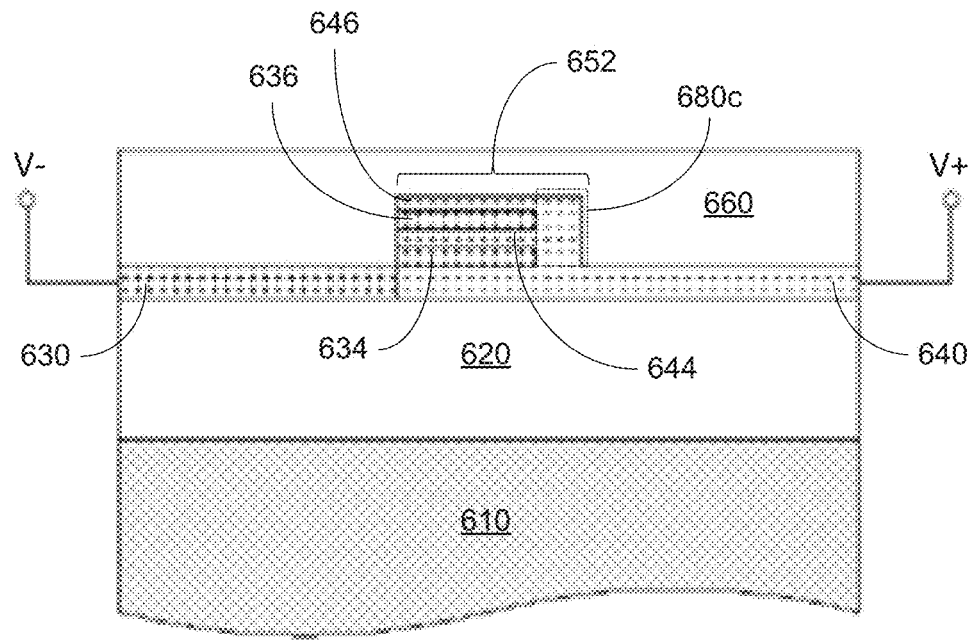
FIG. 9B shows a cross-section of the phase shifter shown in FIG. 8 along the line B-B.
Figure 9C:
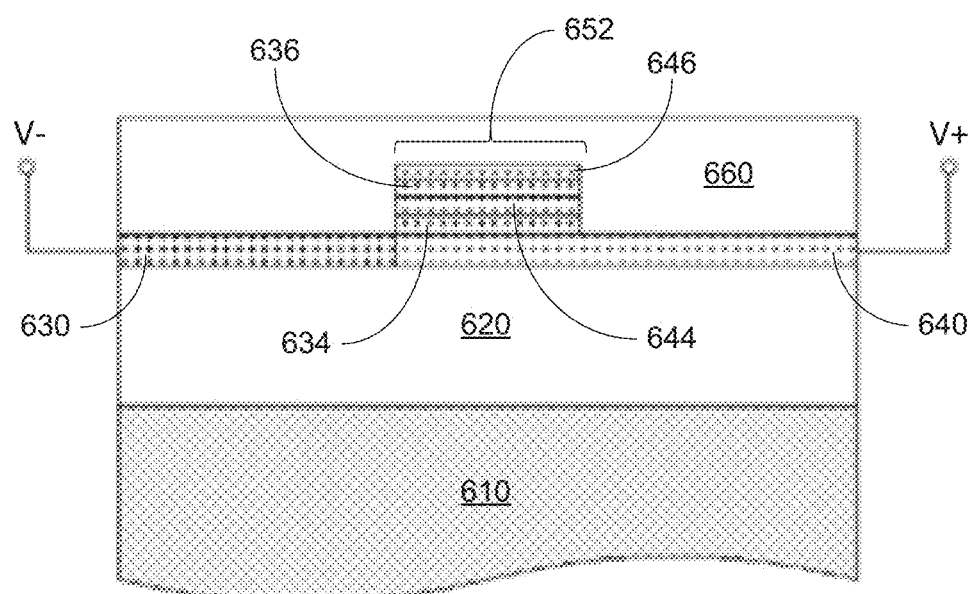
FIG. 9C shows a cross-section of the phase shifter shown in FIG. 8 along the line C-C.

FIGS. 9A-C are cross-sections of the phase shifter of FIG. 8 along the lines A-A, B-B, and C-C, respectively. FIG. 9A shows the cross-section of the phase shifter of FIG. 8 indicated by the line A-A. The p-doped pillar 670c is situated vertically in the rib region 652, and electrically connects the p-doped semiconductor layers 634 and 636 to the p-doped electrode 630 and to each other. The n-doped semiconductor layers 644 and 646 are disconnected from the n-doped electrode 640 in the rib region 652 between adjacent n-doped pillars 680b-c, but the pn junction between the p-doped semiconductor layers 634 and 636 and the n-doped semiconductor layers 644 and 646 is effectively lengthened by the width of the vertical n-doped region 642 in FIG. 4D in the area between adjacent n-doped pillars. The rib region 652 has an "npnpn" stack or configuration, similar to the phase shifter in FIG. 4D.

FIG. 9B shows the cross-section of the phase shifter of FIG. 8 indicated by the line B-B. The n-doped pillar 680c is situated vertically in the rib region 652, and electrically connects the n-doped electrode 640 to the n-doped layers 644 and 646. The interface and/or junction between the n-doped electrode 640 and the p-doped electrode 630 is aligned with the edge or sidewall of the rib region 652 adjacent or closest to the p-doped electrode 630. This decreases the area of the electrical connection between the p-doped electrode 630 and the p-doped layers 634 and 636, but increases the length of the pn interface in the rib region 652 by the width of the vertical p-doped region 632 in FIG. 4D in the area between adjacent p-doped pillars.

FIG. 9C shows the cross-section of the phase shifter of FIG. 8 indicated by the line C-C. No pillars are present in FIG. 9C. In the absence of a pillar or vertical region, the p-n interfaces extend across the entire width of the rib region 652, effectively turning the entire rib region 652 between adjacent pillars into p-n junctions.

Figure 10:
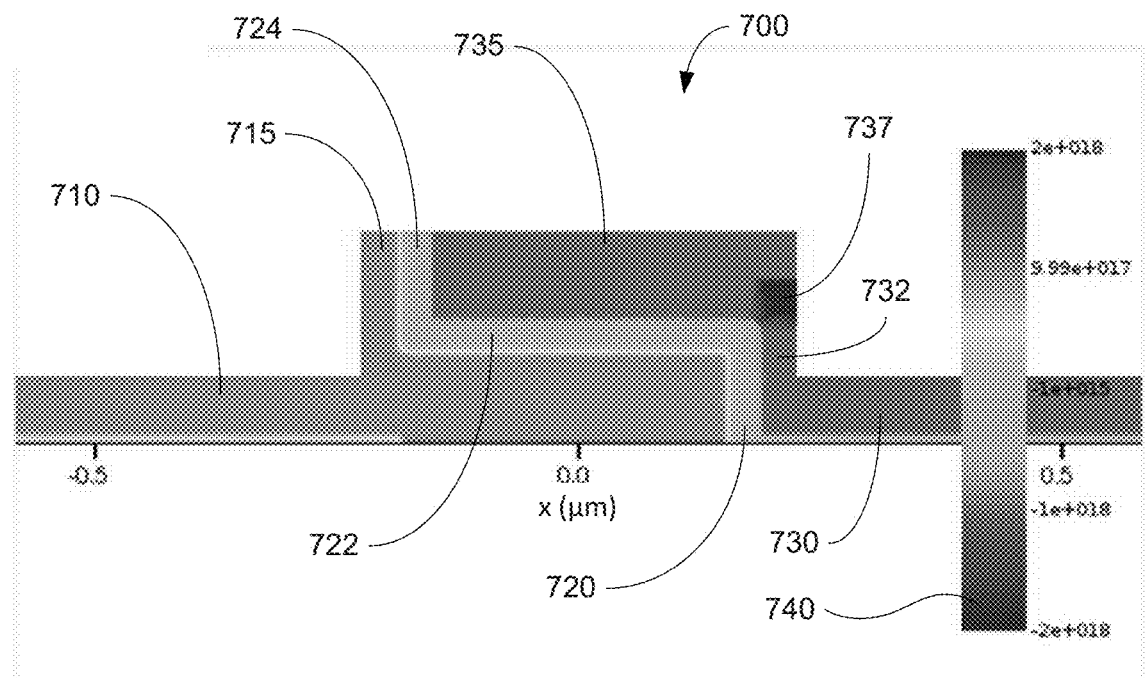
FIG. 10 shows a cross-section of a model of an exemplary phase shifter, in accordance with an embodiment of the present invention.

FIG. 10 is a cross-sectional view of a model for an exemplary phase shifter 700, comprising a p-doped electrode 710, a p-doped vertical region 715, an n-doped electrode 730, an n-doped vertical region 732, an n-doped layer 735, first and second vertical p-n junctions 720 and 724, and a horizontal p-n junction 722. A highly doped n-doped region 737 is in the n-doped vertical region 732, or at the interface between the n-doped vertical region 732 and the n-doped layer 735. The highly n-doped region 737 may arise as an artifact of the manufacturing process. A key 740 shows the level of n-type dopant and p-type dopant within each component in the figure. When an electric field is applied across the phase shifter 700 (i.e., voltages are applied to the electrodes 710 and 730 resulting in a voltage differential across the p-n junctions 720, 722 and 724), the p-n junctions 720, 722 and 724 form a waveguide core, and the phase of the light passing through the p-n junctions 720-724 changes as the refractive index of the material in and near the p-n junctions 720-724 changes. In the example of FIG. 10, the p-n junctions 720-724 represent a band in which approximately equal doses of n-type and p-type dopants coexist, thus forming a functional intrinsic semiconductor band in the rib region of the phase shifter.

The capacitances $C_p$ and $C_n$ (in pF/cm) as the voltage differential across the phase shifter 700 changes overlap significantly and are substantially identical. The capacitances $C_p$ and $C_n$ are the respective capacitances of the p-doped regions 710-715 and the n-doped regions 730-732-735 at the interface with the p-n junction 720-722-724. The capacitances $C_p$ and $C_n$ are nonlinear, and increase slightly exponentially as the voltage increases.

Figure 2:
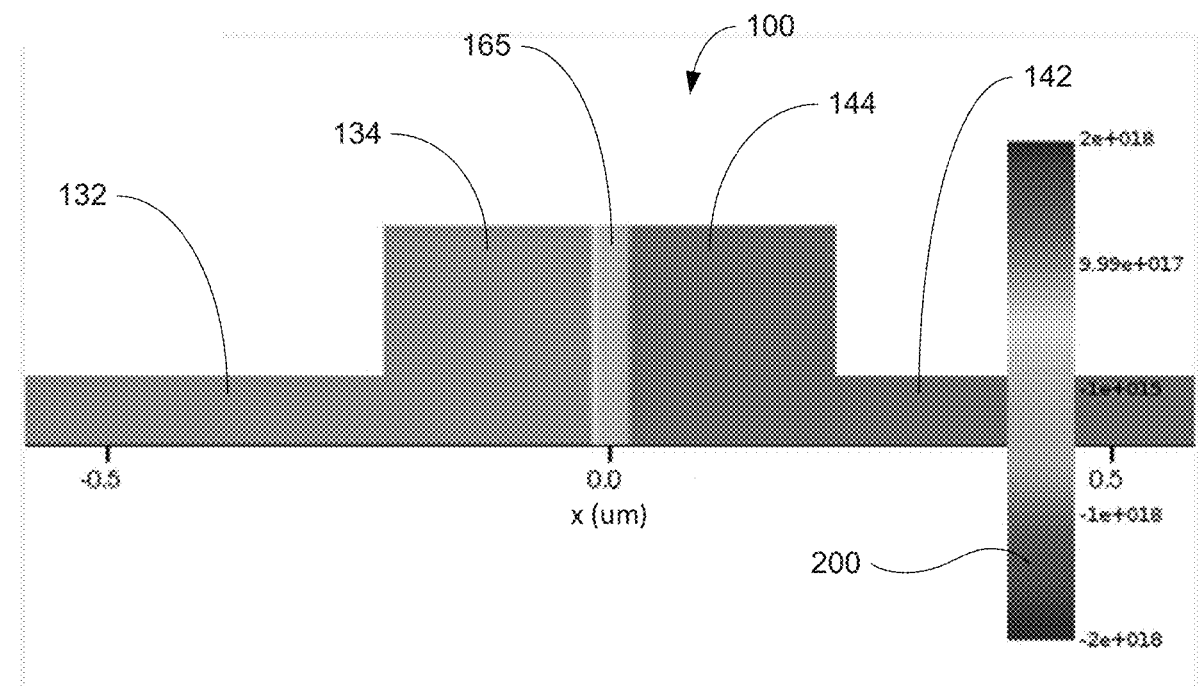
FIG. 2 shows a cross-section of a model of the conventional phase shifter shown in FIGS. 1A-B having a lateral p-n junction.
Figure 3A:
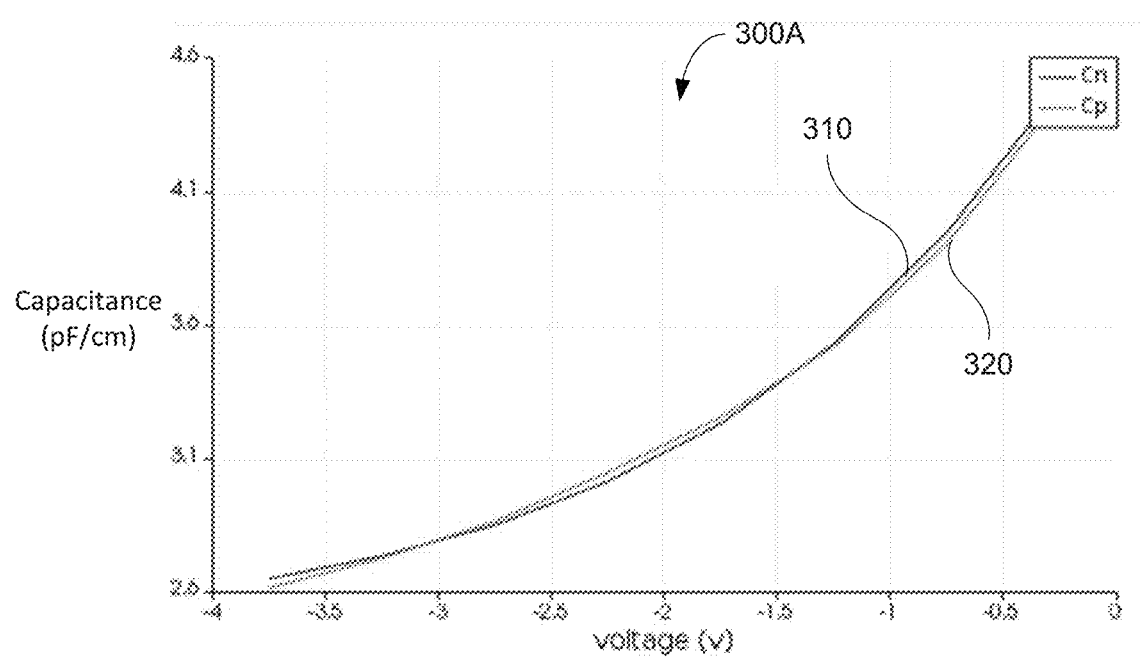
FIGS. 3A-C are graphs showing the capacitances $C_p$ and $C_n$, insertion loss, and 1 cm phase change as a function of the voltage applied to the phase shifter of FIG. 2.
Figure 3B:
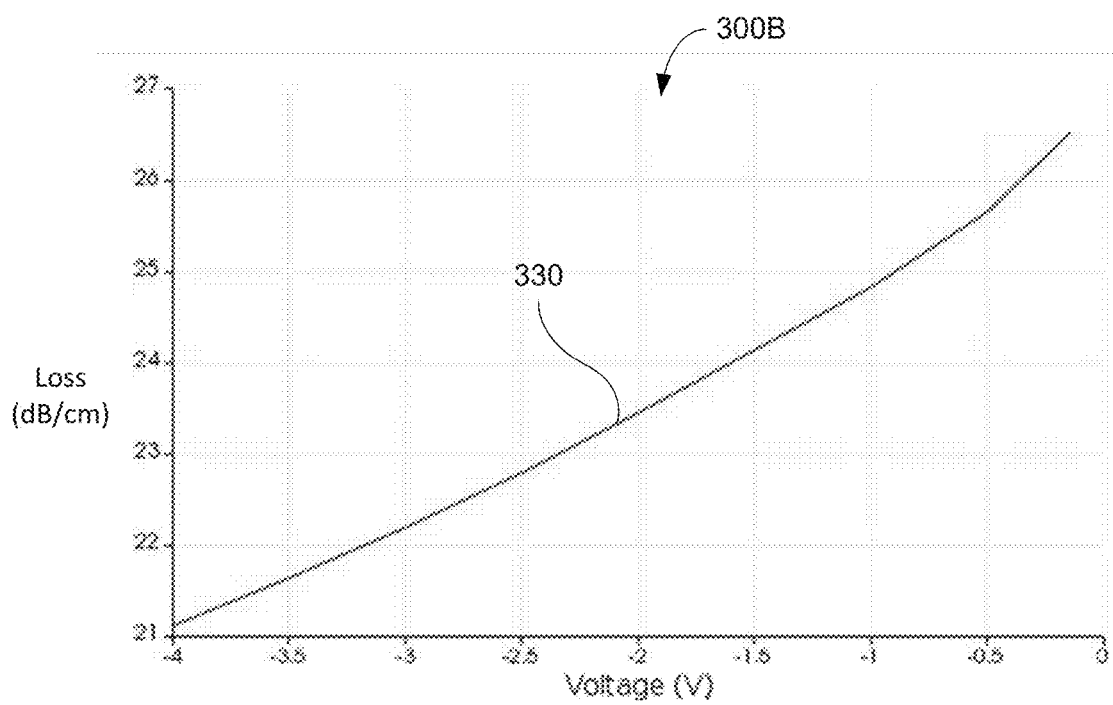

The insertion loss (in dB/cm) at a voltage of −0.2 V applied to the phase shifter 700 is about 21.2 dB/cm; at −1 V, the insertion loss is about 18.8 dB/cm; and at −4 V, the insertion loss is about 12.8 dB/cm. Thus, the insertion loss in the phase shifter 700 is about 6-8 dB/cm less than that of the phase shifter 100 in FIG. 2 having a purely vertical p-n junction. The insertion loss curve for the phase shifter 700 is slightly exponential, similar to the insertion loss curve 330 in FIG. 3B. The insertion loss decreases at a rate of about 3.0 dB/cm per volt in the range of 0 V to −1 V, but at a rate of about 1.4 dB/cm per volt in the range −3 V to −4 V.

Figure 3C:
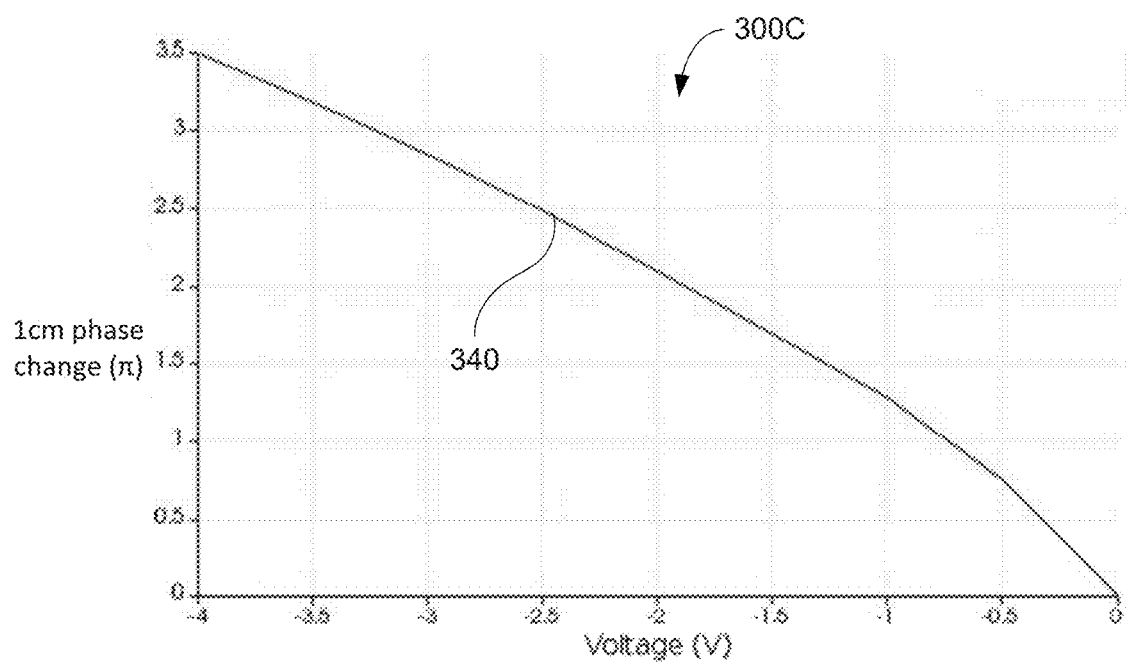

The 1 cm phase change (in $\pi$/cm) at a voltage of −4 V across the phase shifter 700 is about 5.5 $\pi$/cm, and at 0 V, the 1 cm phase change is 0 $\pi$/cm. Thus, the phase change per cm in the phase shifter 700 is about 50% greater than that of the phase shifter 100 in FIG. 2 having a purely vertical p-n junction. The 1 cm phase change for the phase shifter 700 decreases slightly exponentially as the voltage increases in the range of −4 V to 0 V, similar to the phase change curve 340 in FIG. 3C.

Figure 11:
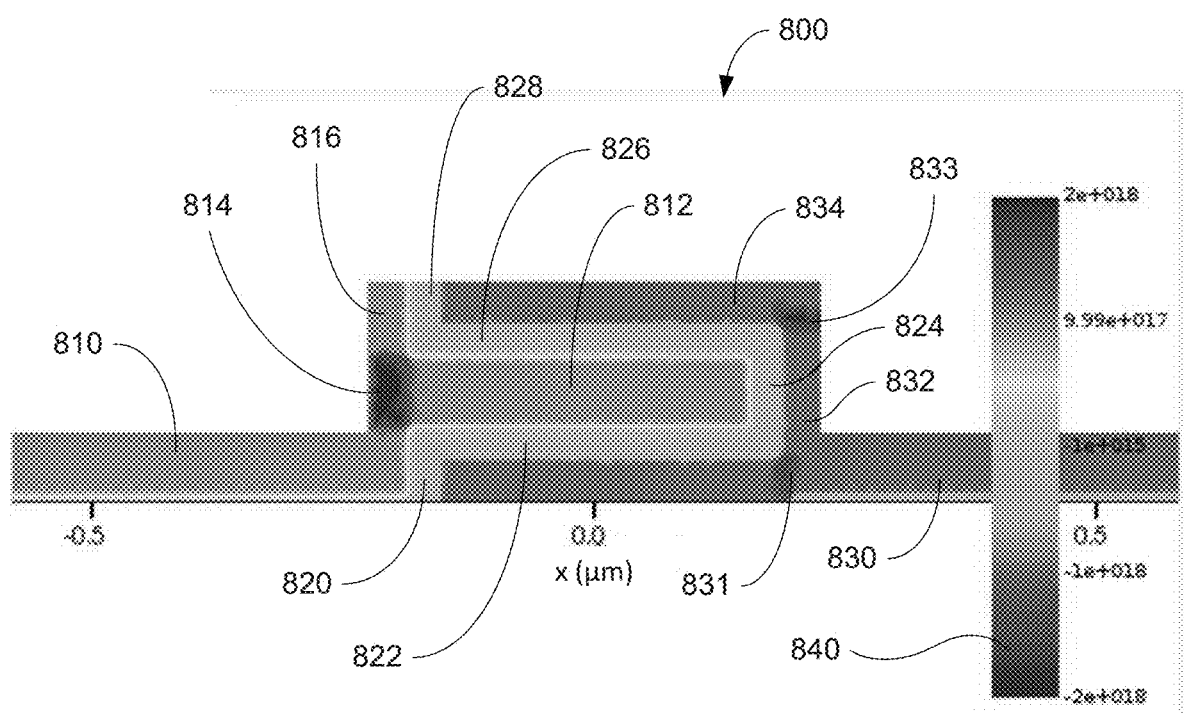
FIG. 11 shows a cross-section of a model of the phase shifter of FIG. 4B, in accordance with an embodiment of the present invention.

FIG. 11 is a cross-sectional view of a model for a phase shifter 800, comprising a p-doped electrode 810, a p-doped layer 812, a p-doped vertical region 816, an n-doped electrode 830, an n-doped layer 834, an n-doped vertical region 832, first, second and third vertical p-n junctions 820, 824 and 828, and first and second horizontal p-n junctions 822 and 826. A highly doped region 814 is in the vertical p-doped region 816, a highly doped region 831 is in the n-doped electrode 830, and a highly doped region 833 is in the n-doped vertical region 832. The highly (p−)doped region 814 and the highly (n−)doped regions 831 and 833 may arise as artifacts of the manufacturing process. A key 840 shows the level of n-type dopant (in blue, or towards the bottom of the scale 840) and p-type dopant (in red, or towards the top of the scale 840) within each component. When an electric field is applied across the phase shifter 800, the refractive index of the semiconductor material in and near the p-n junctions changes, and the phase of the light passing through the semiconductor material in and near the p-n junctions 820-828 changes correspondingly.

The capacitances $C_p$ and $C_n$ (in pF/cm) as the voltage applied across the phase shifter 800 changes overlap significantly and are substantially identical. Unlike FIG. 3A, the capacitances $C_p$ and $C_n$ for the phase shifter 800 are substantially linear in the range of from about −2.75 V to −0.75 V. The capacitances $C_p$ and $C_n$ increase at a rate of about 4 pF/cm in the range of from about −2.75 to −0.75 V.

The insertion loss (in dB/cm) at a voltage of 0 V applied to the phase shifter 800 is about 17 dB/cm; at −1 V, the insertion loss is about 12.1 dB/cm; and at −4 V, the insertion loss is about 7 dB/cm. Thus, the insertion loss in the phase shifter 800 is about 10-15 dB/cm less than that of the phase shifter 100 in FIG. 2 having a purely vertical p-n junction. The insertion loss curve for the phase shifter 800 increases slightly exponentially, similar to the insertion loss curve 330 in FIG. 3B. The insertion loss for the phase shifter 800 decreases at a rate of about 3.0 dB/cm per volt in the range 0 V to −1 V, but at a rate of about 1.4 dB/cm per volt in the range of −3 V to −4 V.

The 1 cm phase change (in $\pi$/cm) at a voltage of −4 V across the phase shifter 800 is about 5.75 $\pi$/cm, and at 0 V, the phase change is 0 $\pi$/cm. Thus, the phase change per cm in the phase shifter 800 is about 65% greater than that of the phase shifter 100 in FIG. 2 having a purely vertical p-n junction. The 1 cm phase change for the phase shifter 800 decreases slightly exponentially in the range −4 V to 0 V, similar to but less linearly than the phase change curve 340 in FIG. 3C.

Figure 12:
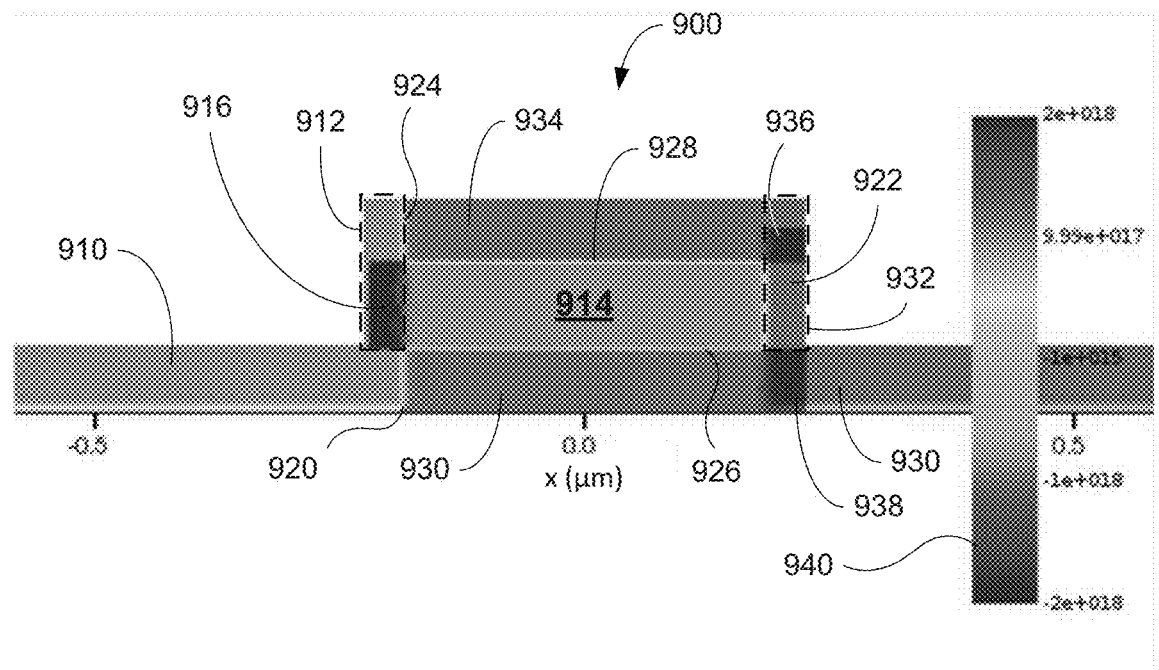
FIG. 12 shows a cross-section of another model of the exemplary phase shifter shown in FIG. 4B, in accordance with an embodiment of the present invention.

FIG. 12 is a cross-sectional view of a model for a phase shifter 1100, comprising a p-doped electrode 1110, a p-doped vertical region 1112, a p-doped layer 1114, an n-doped electrode 1130, an n-doped vertical region 1132, an n-doped layer 1134, first, second and third vertical p-n junctions 1120, 1122 and 1124, and first and second horizontal p-n junctions 1126 and 1128. A highly doped p-type region 1116 and highly doped n-type regions 1136 and 1138 may arise as artifacts of the manufacturing process.

The phase shifter 900 of FIG. 12 differs from the phase shifter 800 of FIG. 11 in that the p-doped layer 914 and the n-doped layer 934 in the phase shifter 900 of FIG. 12 are formed by epitaxial growth in the presence of a dopant and thus include a uniformly distributed dopant, whereas the corresponding layers 814 and 834 in the phase shifter 800 of FIG. 11 are formed by ion implantation and include a dopant having a gradient distribution. As a result, the p-n junctions 820-828 in FIG. 11 is wider, but the interface between the p-n junctions 920-928 and the p-doped and n-doped layers 914 and 934 in FIG. 12 is more well-defined. A key 940 shows the levels of n-type dopant and p-type dopant within each component. When an electric field is applied across the phase shifter 900, the refractive index of the semiconductor material in and near the p-n junctions 920-928 changes, and the phase of the light passing through such semiconductor material changes correspondingly.

The capacitances $C_p$ and $C_n$ (in pF/cm) as the voltage applied across the phase shifter 900 changes overlap significantly and are substantially identical. The capacitances $C_p$ and $C_n$ are nonlinear (i.e., exponential) between about −3.75 V and about −2.25 V, but substantially linear from about −2.25 V to about −0.4 V. Below about −2.75 V, the capacitances $C_p$ and $C_n$ are less than those in the phase shifter 100 in FIG. 2, but above about −2.75 V, the capacitances $C_p$ and $C_n$ increase at a rate that is about an order of magnitude greater than that in the phase shifter 100 in FIG. 2.

The insertion loss (in dB/cm) at a voltage of 0 V applied to the phase shifter 900 is about 18.9 dB/cm; at −1 V, the insertion loss is about 13 dB/cm; and at −4 V, the insertion loss is about 7.6 dB/cm. Thus, the insertion loss in the phase shifter 900 is about 7-14 dB/cm less than that of the phase shifter 100 in FIG. 2 having a purely vertical p-n junction. The insertion loss curve for the phase shifter 900 is substantially nonlinear. The insertion loss for the phase shifter 900 decreases at a rate of about 4.8-4.9 dB/cm per V in the range 0 V to about −2 V, more than double the rate of decrease in the phase shifter 100 in FIG. 2 over the same voltage range.

The 1 cm phase change (in π/cm) at a voltage of −4 V across the phase shifter 900 is about 6.6 π/cm, and at 0 V, the phase change is 0 π/cm. The 1 cm phase change the phase shifter 900 is substantially nonlinear and decreases exponentially in the range −4 V to 0 V. Thus, the phase change per cm in the phase shifter 900 is more than double that of the phase shifter 100 in FIG. 2 over the voltage range between 0 V and about −3 V. Around −3.5 V, the phase change per cm in the phase shifter 900 is about double that of the phase shifter 100 in FIG. 2, and at about −4 V, the phase change per cm in the phase shifter 900 is nearly double that of the phase shifter 100 in FIG. 2.

Figure 13:
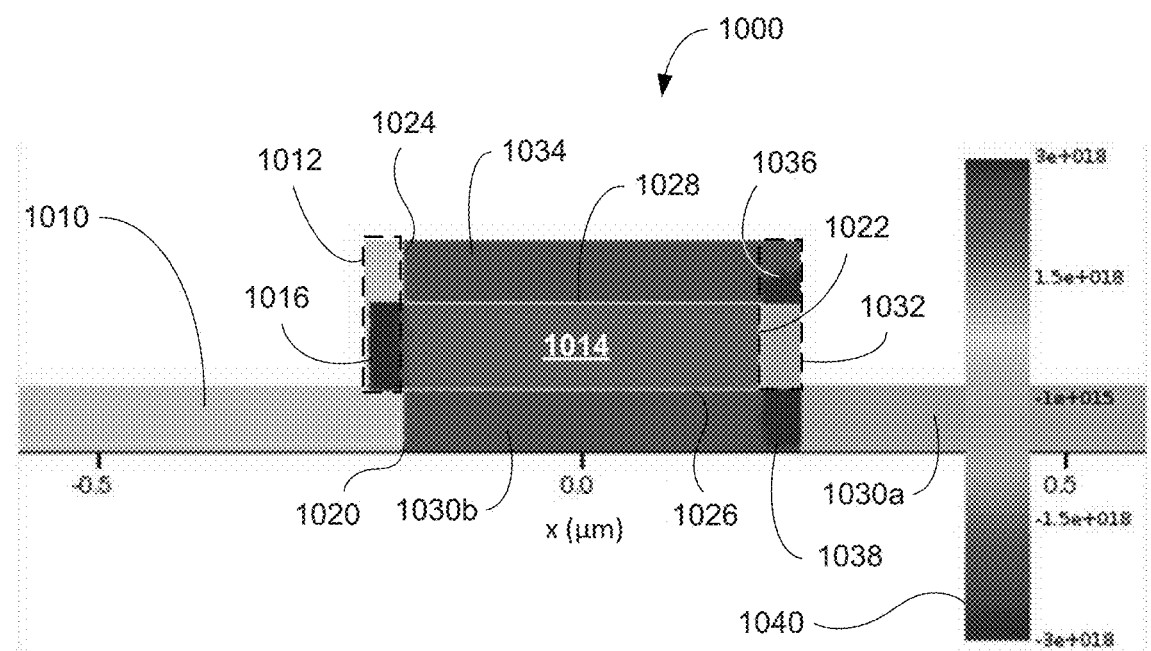
FIG. 13 shows a cross-section of yet another model of a phase shifter having a structure in accordance with the exemplary phase shifter of FIG. 4B.

FIG. 13 is a cross-sectional view of a model for a phase shifter 1000, comprising a p-doped electrode 1010, a p-doped vertical region 1012, a p-doped layer 1014, an n-doped electrode 1030a-b, an n-doped vertical region 1032, an n-doped layer 1034, first, second and third vertical p-n junctions 1020, 1022 and 1024, and first and second horizontal p-n junctions 1026 and 1028. A highly doped region p-type 1016 and highly doped n-type regions 1036 and 1038 may arise as artifacts of the manufacturing process. A key 1040 shows the level of n-type dopant and p-type dopant within each component.

The phase shifter 1000 of FIG. 13 differs from the phase shifter 900 of FIG. 12 in that the p-doped layer 1014 and the n-doped layer 1034 in the phase shifter 1000 of FIG. 13 are more heavily doped than the corresponding layers 914 and 934 in the phase shifter 900 of FIG. 12. When an electric field is applied across the phase shifter 1000, the refractive index of the semiconductor material in and near the p-n junctions 1020-1028 changes, and the phase of the light passing through such semiconductor material changes accordingly.

The capacitances $C_p$ and $C_n$ (in pF/cm) as the voltage applied across the phase shifter 1000 changes overlap and are substantially identical. The capacitances $C_p$ and $C_n$ are substantially linear between about −3.75 V and about −1.75 V, but nonlinear between about −1.75 V and 0 V. The capacitances $C_p$ and $C_n$ increase as the voltage increases, and are about four (4) times greater than the corresponding capacitances $C_p$ and $C_n$ in FIG. 3A (for the phase shifter 100 in FIG. 2).

The insertion loss (in dB/cm) at a voltage of 0 V applied to the phase shifter 1000 is about 40.5 dB/cm; at −1 V, the insertion loss is about 31.1 dB/cm; and at −4 V, the insertion loss is about 16 dB/cm. The insertion loss curve is substantially linear in the range of −4 V to −1 V, but nonlinear between −1 V and 0 V. The insertion loss decreases at a rate of about 5 dB/cm per volt in the range −1 V to −4 V, a rate about four (4) times greater than that for the phase shifter 100 in FIG. 2.

The 1 cm phase change (in π/cm) at a voltage of 0 V across the phase shifter 1000 is about 12.8 π/cm, and at 0 V, the phase change is 0 π/cm. The phase change per cm in the phase shifter 1000 is nearly four (4) times that of the phase shifter 100 in FIG. 2 over the voltage range between 0 V and −4 V. The 1 cm phase change curve for the phase shifter 1000 is substantially linear in the range of −4 V to −2.5 V, but slightly nonlinear between −2.5 V and 0 V. The 1 cm phase change decreases at a rate of about 3.4 π/cm per volt in the range of −4 V to −2.5 V.

Figure 14:
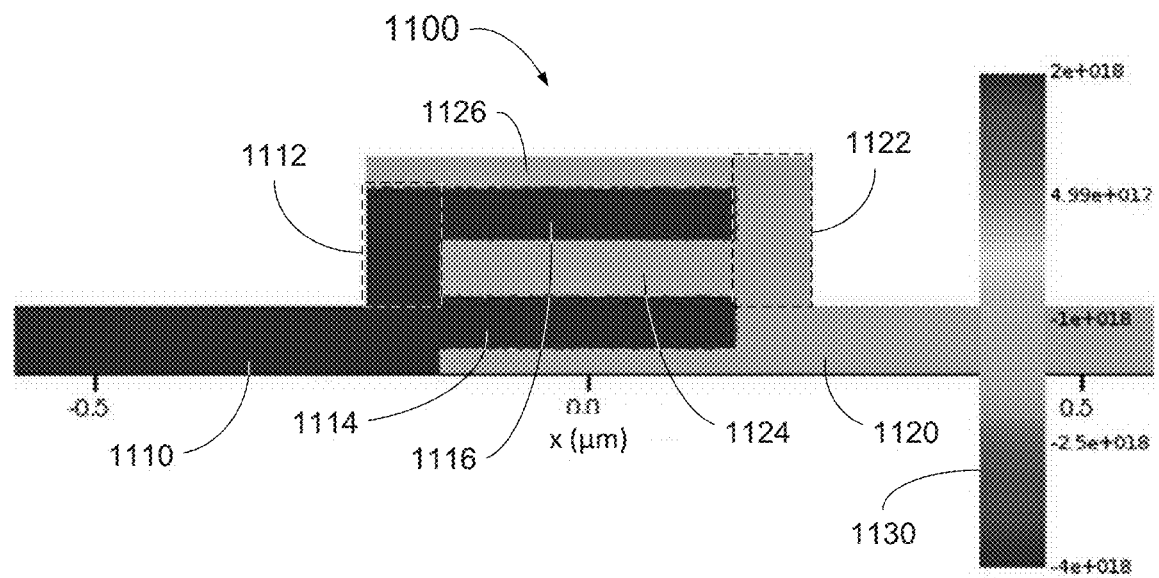
FIG. 14 shows a cross-section of a model of a phase shifter having a structure in accordance with the exemplary phase shifter of FIG. 4D.

FIG. 14 is a cross-sectional view of a model for a phase shifter 1100, comprising a p-doped electrode 1110, a p-doped vertical region 1112, a first p-doped layer 1114, a second p-doped layer 1116, an n-doped electrode 1120, a first n-doped layer 1124, a second n-doped layer 1126, and an n-doped vertical region 1122. FIG. 14 shows the doping profile of the phase shifter 1100. A key 1130 shows the level of n-type dopant (in blue, or towards the bottom of the scale 1130) and p-type dopant (in red/brown, or towards the top of the scale 1130) within each component. For example, each of the p-doped regions 1110-1116 and the n-doped regions 1120-1126 contain a dopant at a dose of about $2 \times 10^{18}$ cm$^{-2}$.

Figure 15A:
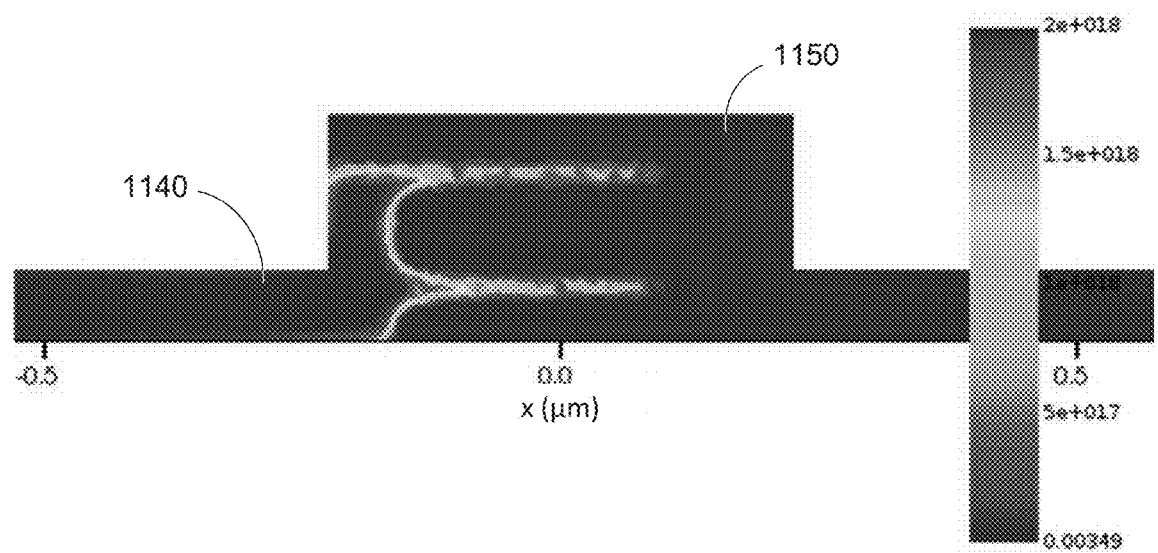
FIGS. 15A-B are diagrams showing the carrier concentrations in the exemplary phase shifter of FIG. 14 at a voltage of −1V.
Figure 15B:
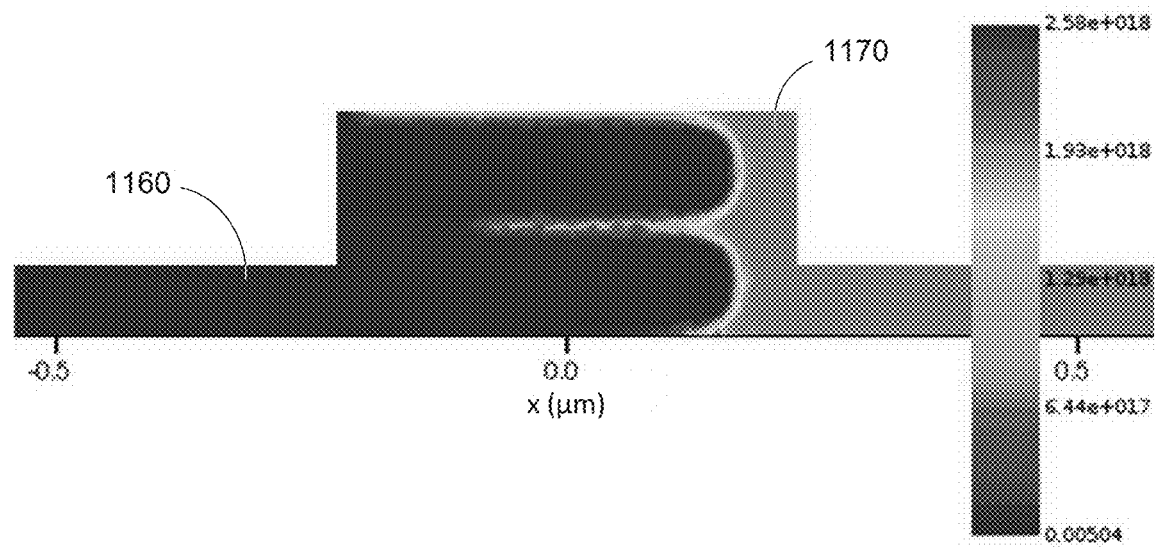

FIGS. 15A-B show the carrier concentrations in the phase shifter 1100 at an applied bias of −1 V. FIG. 15A shows the concentration of holes, and FIG. 15B shows the concentration of electrons, respectively.

Referring to FIG. 15A, region 1140, which overlaps extensively with the p-doped electrode 1110 and the p-doped vertical region 1112, contains the maximum concentration of holes (about $2 \times 10^{18}$ cm$^{-2}$), whereas region 1150, which overlaps extensively with the n-doped electrode 1120, the n-doped vertical region 1122, the p-doped and n-doped layers 1114, 1116, 1124 and 1126, and the part of the n-doped electrode 1120 below the first p-doped layer 1114 (except for relatively thin areas midway through the p-doped layers 1114 and 1116 and the n-doped layer 1124) contains a minimum concentration of holes.

Referring to FIG. 15B, region 1170, which overlaps extensively with the n-doped electrode 1120 (except for the part of the n-doped electrode 1120 below the first p-doped layer 1114) and the n-doped vertical region 1122, contains the maximum concentration of electrons (about $2 \times 10^{18}$ cm$^{-2}$), whereas region 1160, which overlaps extensively with the p-doped electrode 1110, the p-doped vertical region 1112, and the p-doped and n-doped layers 1114, 1116, 1124 and 1126 (except for a relatively thin area midway through the n-doped layer 1124) contains a minimum concentration of electrons. This means that there are relatively few carriers in the p-doped and n-doped layers 1114, 1116, 1124 and 1126 and the part of the n-doped electrode 1120 below the first p-doped layer 1114 (i.e., "npnpn stack"). As a result, the phase shifter 1100 in FIG. 14 can be very efficient throughout the entire npnpn stack.

Figure 16A:
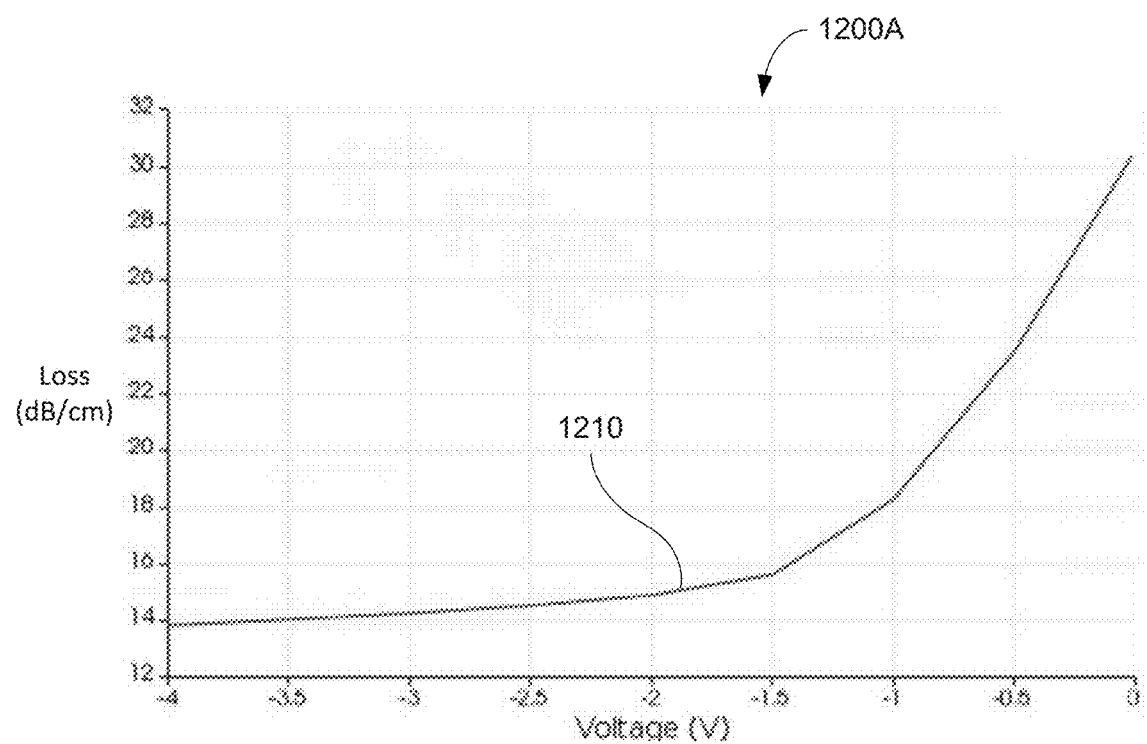
FIGS. 16A-B are graphs showing the insertion loss and phase change/phase shift as a function of the voltage applied to the phase shifter shown in FIG. 14.

FIG. 16A is a graph 1200A showing the insertion loss (in dB/cm) as the voltage applied to the phase shifter 1100 changes. At 0 V, the insertion loss is slightly more than 30 dB/cm. At −1 V, the insertion loss is about 18 dB/cm, and at −4 V, the insertion loss is a little less than 14 dB/cm. The curve 1210 is nonlinear at voltages above −2 V. The insertion loss of the phase shifter 1100, which is at least 7 dB/cm less than the phase shifter 200 of FIG. 2 at voltages below −1.5 V, decreases at a rate of about 12 dB/cm per volt in the range 0 V to −1 V, and about 4.5 dB/cm per volt in the range −1 V to −1.5 V.

Figure 16B:
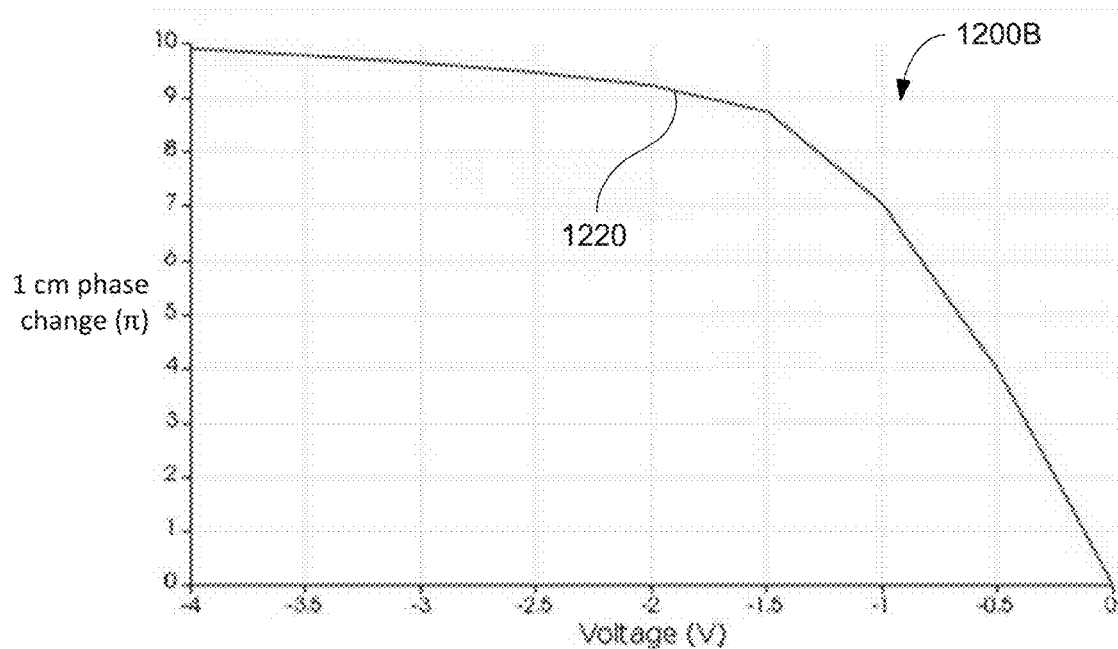

FIG. 16B is a graph 1200B showing the variation of the 1 cm phase change (in π/cm) as the voltage across the phase shifter 1100 changes. At −4 V, the phase change is about 10 π/cm, and at 0 V, the phase change is 0 π/cm. The curve 340 is substantially linear in the ranges of −4 V to −2 V and −1 V to 0 V, but nonlinear between −2 V and −1 V. The phase change per cm decreases by about 0.4π per V as the voltage increases from −4 V to −2 V, but at a rate of about 7π per V as the voltage increases from −1 V to 0 V.

Methods of Manufacturing a Phase Shifter

FIGS. 17A-L show cross-sections of intermediate and final structures in an exemplary method of manufacturing a phase shifter having stacked, alternating p-doped and n-doped semiconductor layers, in accordance with embodiments of the present invention.

Figure 17A:
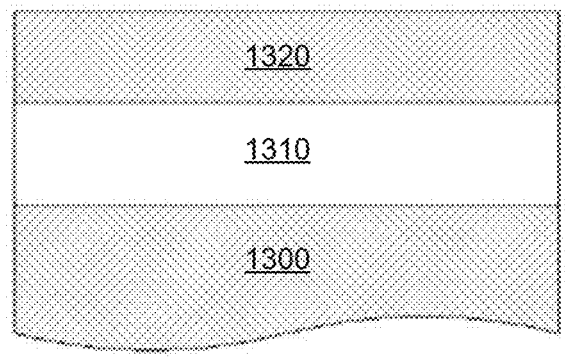
FIGS. 17A-L show cross-sections of intermediate and final structures in an exemplary method of manufacturing a phase shifter having stacked, alternating p-doped and n-doped semiconductor layers in accordance with embodiments of the present invention.

FIG. 17A shows a substrate 1300, a first insulator layer 1310, and a semiconductor layer 1320. The substrate 1300 may comprise a crystalline semiconductor substrate (as described herein), the first insulator layer 1310 may comprise an insulator such as silicon dioxide, and the semiconductor layer 1320 may comprise mono- or polycrystalline silicon, as described herein. The combination of the substrate 1300, the first insulator layer 1310, and the semiconductor layer 1320 may comprise a conventional silicon-on-insulator (SOI) wafer.

Figure 17B:
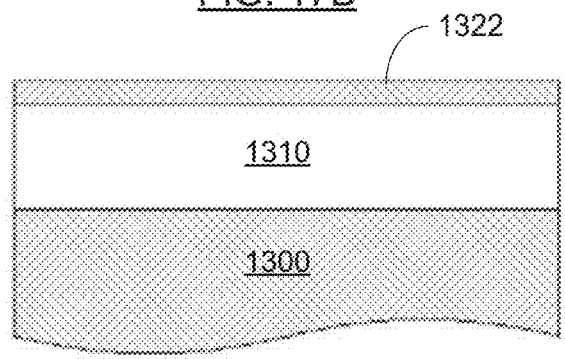

In FIG. 17B, the semiconductor layer 1320 is etched or polished to form a thin semiconductor layer 1322 (e.g., using wet etching or chemical mechanical polishing [CMP]). For example, the semiconductor layer 1320 may be thinned by 30-80%, or alternatively, to a thickness of from 0.5 to 5 μm to form the thin semiconductor layer 1322.

Figure 17D:
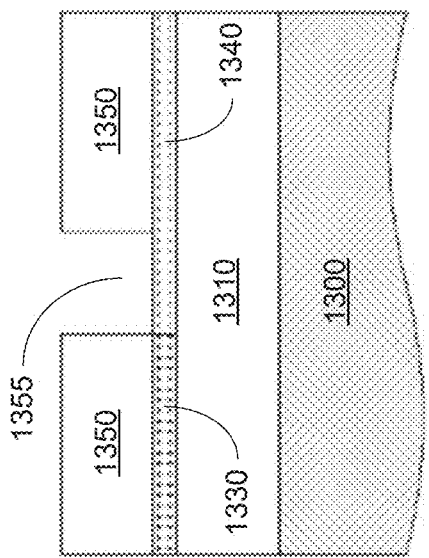
Figure 17F:
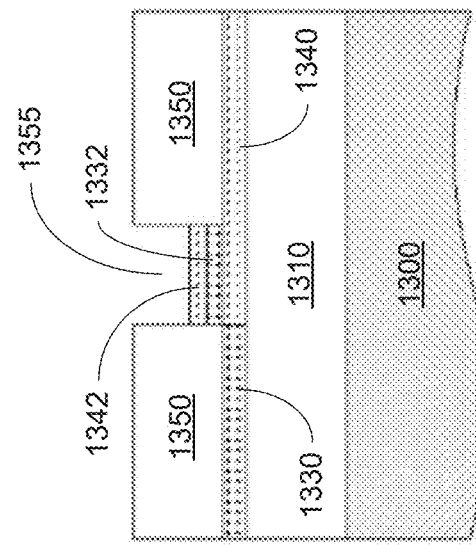
Figure 17C:
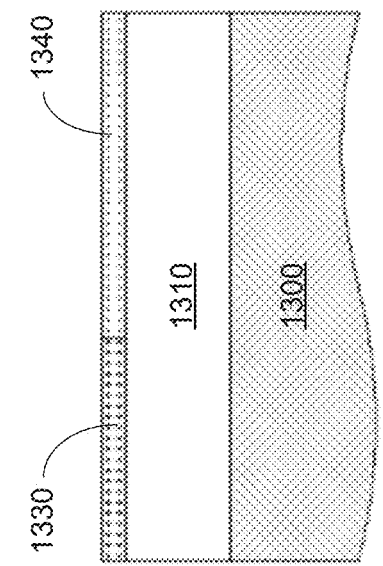

In FIG. 17C, part of the thin semiconductor layer 1322 is masked with an implant mask (not shown) by conventional photolithographic patterning, and the exposed portion is doped with boron or gallium by conventional ion implantation to form the p-doped electrode 1330. In a separate step, the p-doped electrode 1330 is masked with an implant mask (not shown) by conventional photolithographic patterning, and the previously masked part of the thin semiconductor layer 1322 is doped with phosphorus or arsenic by conventional ion implantation to form the n-doped electrode 1340. Either the p-doped electrode 1330 or the n-doped electrode 1340 may be formed first.

In FIG. 17D, an insulator layer is deposited onto the p-doped and n-doped electrodes 1330 and 1340 by blanket deposition and patterned by conventional photolithographic patterning and etching to form a patterned insulator layer 1350. The patterned insulator layer 1350 may comprise silicon dioxide, silicon nitride, silicon oxynitride, or a polymer (e.g., a photolithographic mask). An opening, trench or cavity 1355 is in the patterned insulator layer 1350 over an end of the n-doped electrode 1340. Alternatively, the opening, trench or cavity 1355 may be over an end of the p-doped electrode 1330 (in which case the subsequent steps in the method that use or introduce a dopant use the complementary dopant type). The opening, trench or cavity 1355 has a sidewall that is aligned as closely as possible with the interface between n-doped electrode 1340 and the p-doped electrode 1330. The patterned insulator layer 1350 may have a thickness of from 0.2 to 5 μm (e.g., 0.5-2.5 μm, or any thickness or range of thicknesses between 0.2 and 5 μm). The opening, trench or cavity 1355 may have a width of from 0.4 to 2 μm (e.g., 0.5-1 μm, or any width or range of widths between 0.4 and 2 μm).

Figure 17E:
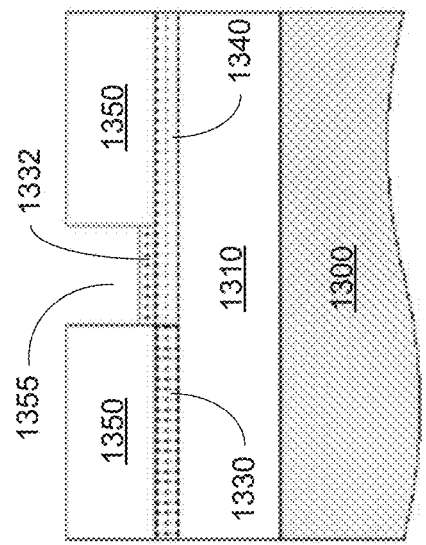

FIG. 17E shows a p-doped layer 1332 epitaxially grown on the n-doped electrode 1340 in the opening, cavity or trench 1355. The patterned insulator layer 1350 thus functions as a mask for the selective growth of the p-doped layer 1332 (and any subsequent layers formed in the opening, cavity or trench 1355). The p-doped layer 1332 may be grown as an intrinsic layer that is subsequently implanted with one or more p-type dopants, or may be grown in the presence of a gas-phase p-type dopant source that is incorporated into the p-doped layer 1332 during epitaxy. The p-doped layer 1332 may have a thickness of from 0.1 to 2 μm (e.g., 0.5-1 μm, or any thickness or range of thicknesses between 0.1 and 2 μm) and may be doped with a dose of from $10^{16}$ to $10^{19}$ cm$^{-2}$ (e.g., $10^{17}$ to $5 \ast 10^{18}$ cm$^{-2}$ or any other dosage or range of dosages between $10^{16}$ and $10^{18}$ cm$^{-2}$) of dopant.

FIG. 17F shows an n-doped layer 1342 epitaxially grown on the p-doped layer 1332 in the opening, cavity or trench 1355. The n-doped layer 1342 may have a thickness of from 0.1 to 2 μm (e.g., 0.5-1 μm, or any thickness or range of thicknesses between 0.1 and 2 μm) and may be doped with a dose of from $10^{16}$ to $10^{19}$ cm$^2$ (e.g., $10^{17}$ to $5 \ast 10^{18}$ cm$^{-2}$ or any other dosage or range of dosages between $10^{16}$ and $10^{18}$ cm$^{-2}$) of dopant. The n-doped layer 1342 may be formed similarly to the p-doped layer 1332 (e.g., an intrinsic semiconductor such as silicon may be grown epitaxially, then implanted with an n-type dopant, or a gas-phase n-type dopant source can be added to the semiconductor source during epitaxy).

Figure 17G:
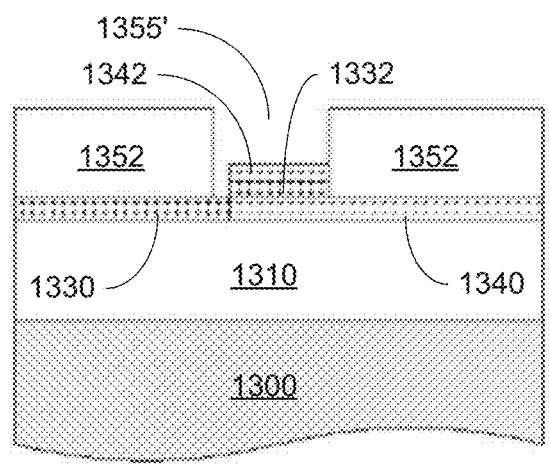

In FIG. 17G, a part of the patterned insulator layer 1350 adjacent to the p-doped and n-doped layers 1332 and 1342 and over the p-doped electrode 1330 may be selectively etched (e.g., using photolithographic patterning and dry etching) to form an expanded opening, cavity or trench 1355' in a modified patterned insulator layer 1352. The expanded opening, cavity or trench 1355' exposes a part of the p-doped electrode 1330 adjacent to the interface with the n-doped electrode 1340.

Alternatively, a second patterned insulator layer 1352 may be formed by removing the first patterned insulator layer 1350 and separately depositing a second insulator layer (e.g., by blanket deposition) and patterning it (e.g., by photolithographic patterning and wet or dry etching). The second insulator layer may be selected from the same materials as the first insulator layer, but is not required to be the same material as the first insulator layer.

Figure 17J:
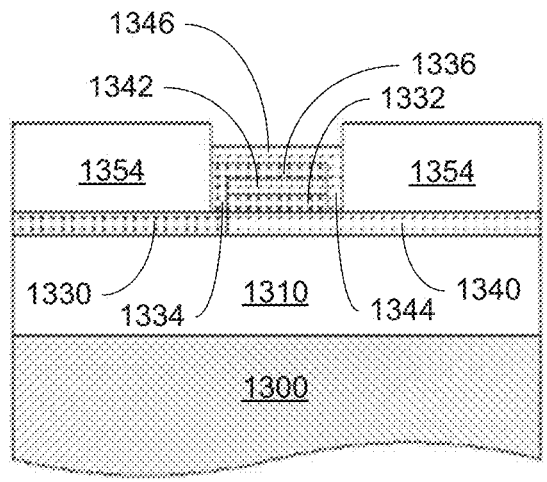
Figure 17H:
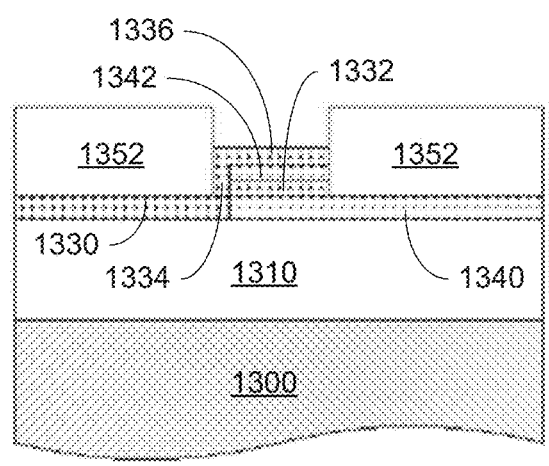

FIG. 17H shows a p-doped structure epitaxially grown on the p-doped electrode 1330 and the n-doped layer 1342. The p-doped structure comprises a p-doped vertical region 1334 a p-doped layer 1336. The p-doped layer 1336 may have a thickness of from 0.1 to 2 µm (e.g., 0.5-1 µm, or any thickness or range of thicknesses between 0.1 and 2 µm). The p-doped vertical region 1334 may have a thickness or depth equivalent to the combination of thicknesses of the p-doped and n-doped layers 1332, 1342, and 1336. For example, the p-doped vertical region 1334 may have a thickness or depth of from 0.3 to 6 µm (e.g., 1.5-4 µm, or any thickness or range of thicknesses between 0.3 and 6 µm). The p-doped layer 1336 and the p-doped vertical region 1334 may be doped with a dose of from $10^{16}$ to $10^{19}$ cm$^{-2}$ (e.g., $10^{17}$ to $5*10^{18}$ cm$^{-2}$ or any other dosage or range of dosages between $10^{16}$ and $10^{18}$ cm$^{-2}$) of dopant. The p-doped vertical region 1334 and p-doped layer 1336 may be formed by incorporation of a p-type dopant during epitaxy similarly to the n-doped layer 1342 and p-doped layer 1332. Alternatively, following formation of the structure corresponding to the p-doped vertical region 1334 and p-doped layer 1336 by epitaxial growth of an intrinsic semiconductor and removal of the patterned insulator layer 1352, a mask may be formed on or over the n-electrode 1340, and the p-doped vertical region 1334 and p-doped layer 1336 may be doped by angled ion implantation.

Figure 17K:
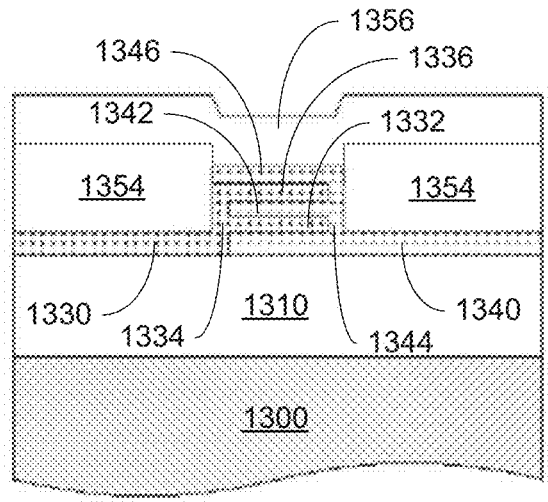
Figure 17I:
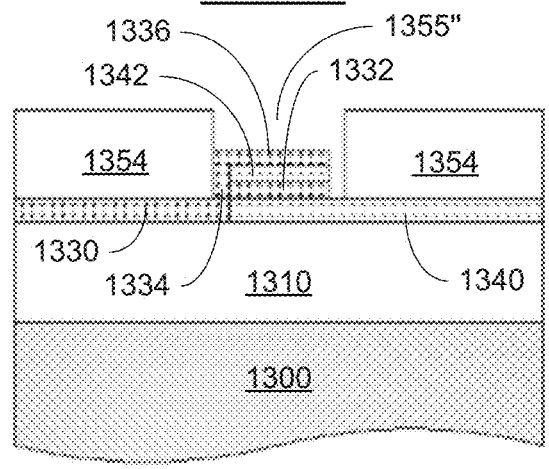

In FIG. 17I, the insulator layer 1352 adjacent to the p-doped layers 1332 and 1336 and the n-doped layer 1342, and over the n-doped electrode 1340 may be selectively etched (e.g., using photolithographic patterning and dry etching) to form a further expanded opening, cavity, or trench 1355" in a further modified insulator layer 1354. The further expanded opening, cavity or trench 1355" exposes a part of the n-doped electrode 1330 adjacent to the p-doped layers 1332 and 1336 and the n-doped layer 1342.

Alternatively, a third patterned insulator layer 1354 may be formed by removing the patterned insulator layer 1352 and separately depositing a third insulator layer (e.g., by blanket deposition) and patterning it (e.g., by photolithographic patterning and wet or dry etching). The third insulator layer may be selected from the same materials as the first and/or second insulator layers, but is not required to be the same material as either the first insulator layer or the second insulator layer.

FIG. 17J shows an n-doped structure epitaxially grown on the n-doped electrode 1340 and the p-doped layer 1336. The n-doped structure n-doped layer 1342 n-doped vertical region 1344 and an n-doped layer 1346. The n-doped layer 1346 may have a thickness of from 0.1 to 2 µm (e.g., 0.5-1 µm, or any thickness or range of thicknesses between 0.1 and 2 µm). The n-doped vertical region 1344 may have a thickness equivalent to the combination of thicknesses of the p-doped and n-doped layers 1332, 1336, 1342 and 1346. For example, the n-doped vertical region 1344 may have a thickness of from 0.4 to 6 µm (e.g., 2-4 µm, or any thickness or range of thicknesses between 0.4 and 6 µm). The n-doped layer 1346 and the n-doped vertical region 1344 may be doped with a dose of from $10^{16}$ to $10^{19}$ cm$^{-2}$ (e.g., $10^{17}$ to $5*10^{18}$ cm$^2$ or any other dosage or range of dosages between $10^{16}$ and $10^{18}$ cm$^{-2}$) of dopant. The n-doped vertical region 1334 and n-doped layer 1346 may be formed in the same way as the p-doped vertical region 1334 and p-doped layer 1336, but using an n-type dopant or dopant source instead of a p-type dopant.

FIG. 17K shows an additional insulator layer 1356 formed on the patterned insulator layer 1354 and the n-doped layer 1346 (e.g., by conformal blanket deposition). The additional insulator layer 1356 may comprise silicon dioxide, silicon nitride or a silicon oxynitride, and may have a thickness of from 1 to 5 µm (or any value or range of values therein).

Figure 17L:
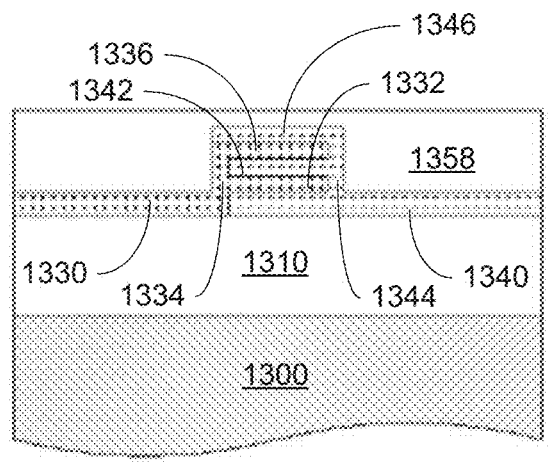

In FIG. 17L, the additional insulator layer 1356 (and, optionally, the patterned insulator layer 1354) are planarized (e.g., by chemical mechanical polishing [CMP]) to form a planar insulator layer 1358, which functions as a cladding for the waveguide core. FIG. 17L shows a complete or substantially complete phase shifter.

FIGS. 18A-I show cross-sections of intermediate and final structures in an alternative exemplary method of manufacturing a phase shifter having stacked, alternating p-doped and n-doped semiconductor layers, in accordance with embodiments of the present invention.

Figure 18A:
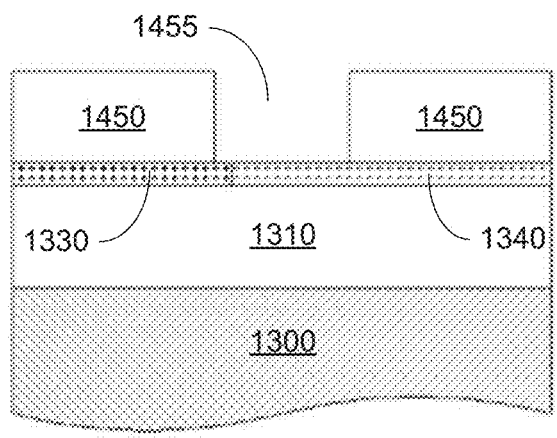
FIGS. 18A-I show cross-sections of intermediate and final structures in an alternative exemplary method of manufacturing a phase shifter having stacked, alternating p-doped and n-doped semiconductor layers in accordance with embodiments of the present invention.

Starting from the structure in FIG. 17C, FIG. 18A shows a patterned insulator layer 1450 on the p-doped electrode 1330 and the n-doped electrode 1340. An opening, trench or cavity 1455 in the patterned insulator layer 1450 exposes the interface between the p-doped and n-doped electrodes 1330 and 1340. The opening, trench or cavity 1355 has a sidewall that is offset from the interface between the p-doped and n-doped electrodes 1330 and 1340 by the width of a subsequently-formed vertical region. As shown, one sidewall of the opening, trench or cavity 1455 is offset from an end of the p-doped electrode 1330 by the width of a subsequently-formed p-doped vertical region, but another sidewall of the opening, trench or cavity 1455 may be offset from an end of the n-doped electrode 1340 by the width of a subsequently-formed n-doped vertical region (in which case the subsequent steps in the alternate method that use or introduce a dopant use the complementary dopant type).

The components shown in FIG. 18A may be the same or substantially the same as the similarly named and/or labeled components shown in FIG. 17D, except that "15" in the identification number in FIG. 17D may be changed to "16." Thus, the patterned insulator layer 1450 may have a same thickness as the patterned insulator layer 1350 in FIG. 17D, and the opening, trench or cavity 1455 (FIG. 18A) may have a same depth and width as the opening, trench or cavity 1355 in FIG. 17D.

Figure 18D:
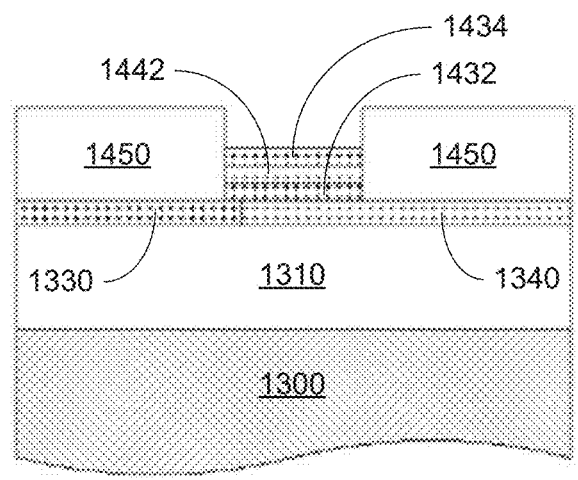
Figure 18B:
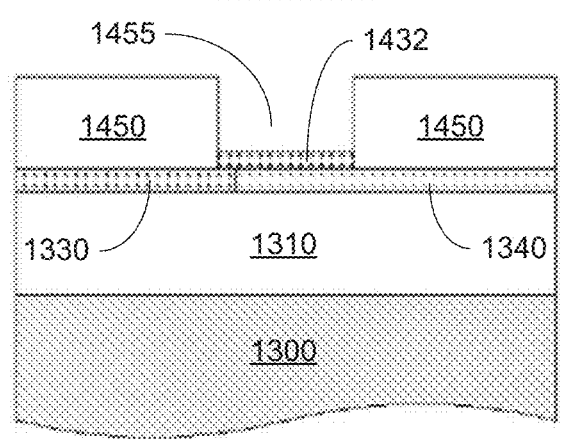

FIG. 18B shows a p-doped layer 1432 epitaxially grown on the p-doped and n-doped electrodes 1330 and 1340 in the opening, cavity or trench 1455. The p-doped layer 1432 may be formed in the same manner as the p-doped layer 1332 in FIG. 17E, and thus may have a thickness and a dose of dopant in the ranges disclosed for the p-doped layer 1332. However, the p-doped layer 1432 overlaps (and thus forms an electrical contact) with the p-doped electrode 1330.

Figure 18E:
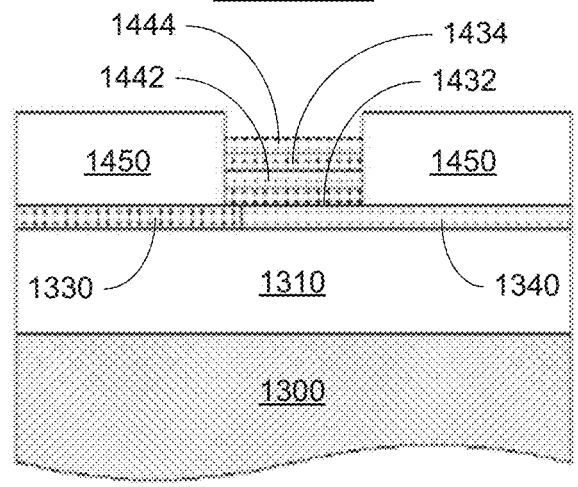
Figure 18C:
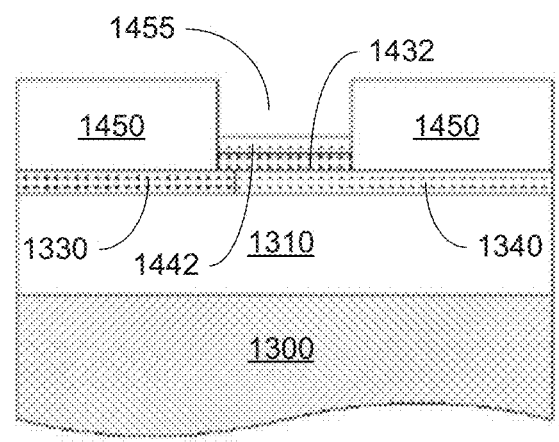

FIG. 18C shows an n-doped layer 1442 epitaxially grown on the p-doped layer 1432 in the opening, cavity or trench 1455. The n-doped layer 1442 may be formed in the same manner as the n-doped layer 1342 in FIG. 17F, and thus may have a thickness and a dose of dopant in the ranges disclosed for the n-doped layer 1342.

FIG. 18D shows a second p-doped layer 1434 epitaxially grown on the n-doped layer 1442 in the opening, cavity or trench 1455. The second p-doped layer 1434 may be formed in the same manner as the first p-doped layer 1432 in FIG. 18B.

FIG. 18E shows a second n-doped layer 1444 epitaxially grown on the p-doped layer 1434 in the opening, cavity or trench 1455. The second n-doped layer 1444 may be formed in the same manner as the first n-doped layer 1442 in FIG. 18C.

Figure 18F:
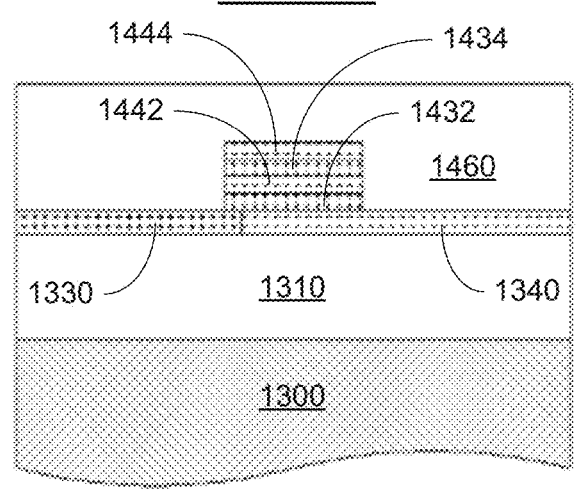

FIG. 18F shows an insulator layer 1460 over the entire pnpn stack 1432, 1442, 1434 and 1444. In one example, similar to the processes shown in and discussed above with respect to FIGS. 17K-L, a further insulator or dielectric layer is deposited onto the patterned insulator layer 1450 and the second n-doped layer 1444 (e.g., by blanket deposition), and the further insulator or dielectric layer (and optionally the uppermost part of the patterned insulator layer 1450) is planarized (e.g., by polishing) to form the insulator layer 1460. Alternatively, the patterned insulator layer 1450 may be removed (e.g., by selective [wet] etching), and the insulator layer 1460 is formed by blanket deposition and subsequent polishing of the insulator/dielectric material. In various examples, the insulator layer 1460 may comprise silicon dioxide, silicon nitride or silicon oxynitride.

Figure 18G:
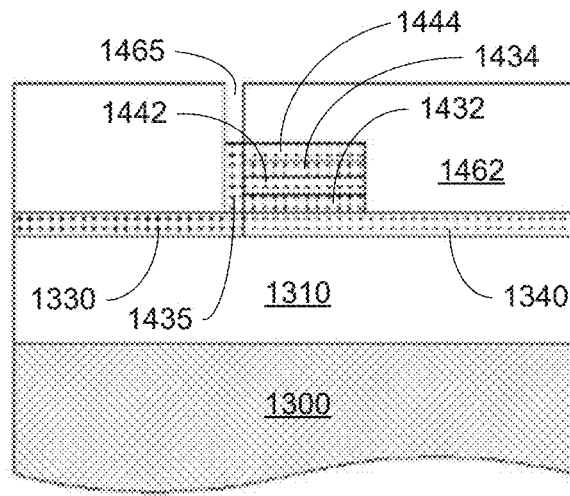

In FIG. 18G, the insulator layer 1460 may be selectively etched (e.g., using photolithographic patterning and dry etching) to form a first opening, cavity, or trench 1465 exposing a part or region of the n-doped layer 1444 over the p-doped electrode 1330 and forming a patterned insulator layer 1462. A p-doped vertical region 1435 is formed in the pnpn stack 1432, 1442, 1434 and 1444 in electrical contact with the p-doped electrode 1330.

The p-doped vertical region 1435 may have the same width as that of a vertical region as described herein (e.g., 0.02 to 1 µm, or any other width or range of widths therein) and a depth or thickness equal to or greater than the sum of the thicknesses of the p-doped and n-doped layers 1432, 1434, 1442 and 1444. In some embodiments, the patterned insulator layer 1462 has a height or thickness above the pnpn stack 1432, 1434, 1442 and 1444 greater than or equal to the height or thickness of the pnpn stack 1432, 1434, 1442 and 1444. For example, the p-doped vertical region 1435 may have a thickness of from 0.4 to 8 µm (e.g., 2-4 µm, or any thickness or range of thicknesses between 0.4 and 8 µm). The p-doped vertical region 1435 is doped with a dose of dopant greater than that in each of the n-doped layers 1442 and 1444.

Alternatively, the insulator layer 1460 may comprise or consist of a conventional photoresist, and conventional development of the irradiated photoresist can form the opening 1465 in the patterned insulator layer 1462. In such a case, the height or thickness of the photoresist over the pnpn stack 1432, 1434, 1442 and 1444 generally exceeds the height or thickness of the pnpn stack 1432, 1434, 1442 and 1444.

Figure 18H:
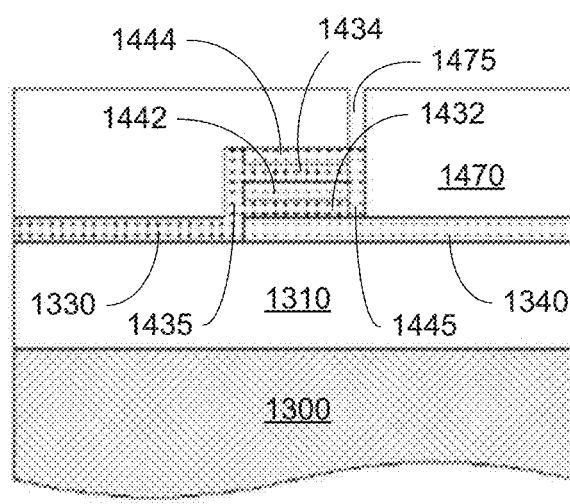

FIG. 18H shows an insulator layer 1470 patterned to form a second opening, cavity, or trench 1475 exposing a part or region of the n-doped layer 1444 over the n-doped electrode 1340. In preferred embodiments, the peripheral region of the n-doped layer 1444 (e.g., along or adjacent to the sidewall of the pnpn stack 1432, 1442, 1434 and 1444 farthest away from the p-doped electrode 1330) is exposed by the opening, cavity, or trench 1475. An n-doped vertical region 1445 is formed in the pnpn stack 1432, 1442, 1434 and 1444 in electrical contact with the n-doped electrode 1340.

The n-doped vertical region 1445 may have the same width as that of a vertical region as described herein and a depth or thickness equal to or greater than the sum of the thicknesses of the p-doped and n-doped layers 1432, 1434, 1442 and 1444. In some embodiments, the insulator layer 1470 has a height or thickness above the pnpn stack 1432, 1434, 1442 and 1444 greater than or equal to the height or thickness of the pnpn stack 1432, 1434, 1442 and 1444, similar or identical to the patterned insulator layer 1462 in FIG. 18G. The n-doped vertical region 1445 is doped with a dose of dopant greater than that in each of the p-doped layers 1432 and 1434.

In the alternative embodiment in which the insulator layer 1460 comprises or consists of a conventional photoresist, the patterned insulator layer 1462 may be heated (e.g., to a temperature of about 200-400° C.) to reflow the photoresist and fill the opening 1465. Conventional irradiation and development of the photoresist can form the opening 1475 in the patterned insulator layer 1470. In such a case, the height or thickness of the reflowed photoresist over the pnpn stack 1432, 1434, 1442 and 1444 generally exceeds the height or thickness of the pnpn stack 1432, 1434, 1442 and 1444.

Figure 18I:
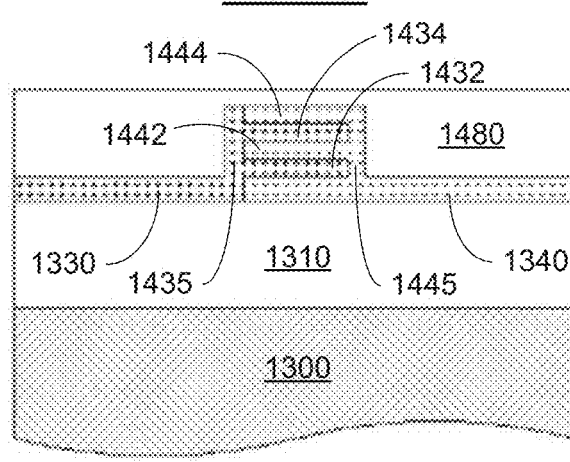

In FIG. 18I, the insulator layer 1470 is removed (e.g., by selective [wet] etching or, in the case of the photoresist, dissolution/washing and/or ashing), and a passivation layer 1480 is formed by blanket deposition of an insulator such as silicon dioxide, silicon nitride, or a silicon oxynitride and planarization (e.g., by CMP). The passivation layer 1480 functions as a cladding for the waveguide core.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical phase shifter comprising:
   a substrate;
   a p-doped electrode and an n-doped electrode on the substrate, the p-doped electrode and the n-doped electrode forming a pn junction at an interface therebetween;
   a first doped semiconductor layer on one of the p-doped electrode and the n-doped electrode and in electrical contact with the other of the p-doped electrode and the n-doped electrode, the first doped semiconductor doped layer having a same doping type as the other of the p-doped electrode and the n-doped electrode;
   a second doped semiconductor layer on the first doped semiconductor layer, the second doped semiconductor layer having a same doping type as the one of the p-doped electrode and the n-doped electrode;
   a third doped semiconductor layer on the second doped semiconductor layer, the third doped semiconductor layer having a same doping type as the other of the p-doped electrode and the n-doped electrode;

a first vertical region electrically connecting the second doped semiconductor layer with the one of the p-doped electrode and the n-doped electrode; and a second vertical region electrically connecting the third doped semiconductor layer with the other of the p-doped electrode and the n-doped electrode, wherein the first doped semiconductor layer is in electrical contact with at least one of the second vertical region and the other of the p-doped electrode and the n-doped electrode.

2. The optical phase shifter of claim 1, wherein the first vertical region is along a first sidewall of the first doped semiconductor layer, and the second vertical region is along a first sidewall of the second doped semiconductor layer opposite from the first sidewall(s) of the first doped semiconductor layer.

3. The optical phase shifter of claim 1, further comprising a cladding layer on or over an uppermost surface of the third semiconductor layer and the first and second vertical regions.

4. The optical phase shifter of claim 1, wherein the second vertical region electrically connects the third doped semiconductor layer, the first doped semiconductor layer, and the other of the p-doped electrode and the n-doped electrode.

5. The optical phase shifter of claim 1, further comprising a fourth doped semiconductor layer on the third doped semiconductor layer, the fourth doped semiconductor layer having a same doping type as the one of the p-doped electrode and the n-doped electrode, wherein the first vertical region electrically connects the fourth doped semiconductor layer with at least one of the second doped semiconductor layer and the one of the p-doped electrode and the n-doped electrode.

6. The optical phase shifter of claim 1, wherein the first doped semiconductor layer is on the n-doped electrode, is in electrical contact with the p-doped electrode, and has the same doping type as the p-doped electrode.

7. The optical phase shifter of claim 6, wherein the second doped semiconductor layer and the first vertical region have the same doping type as the n-doped electrode.

8. The optical phase shifter of claim 1, wherein each of the p-doped electrode, the n-doped electrode, the first doped semiconductor layer, and the second doped semiconductor layer independently comprises monocrystalline or polycrystalline silicon.

9. The optical phase shifter of claim 1, wherein the cladding layer comprises silicon dioxide, silicon nitride or silicon oxynitride.

10. The optical phase shifter of claim 1, wherein the substrate comprises a crystalline semiconductor substrate.

11. The optical phase shifter of claim 1, wherein the substrate comprises a first insulator layer, and the p-doped electrode and the n-doped electrode are on the first insulator layer.

12. The optical phase shifter of claim 11, wherein the first insulator layer comprises silicon dioxide, silicon nitride or silicon oxynitride.

13. The optical phase shifter of claim 12, wherein the substrate comprises a silicon-on-insulator substrate, and the p-doped electrode and the n-doped electrode are on the insulator of the silicon-on-insulator substrate.

14. A method of making an optical phase shifter, comprising:

forming a p-doped electrode and an n-doped electrode on a substrate such that the p-doped electrode and the n-doped electrode form a pn junction at an interface therebetween;

forming a first patterned insulator layer over the p-doped electrode and the n-doped electrode, the first patterned insulator layer having a first trench, opening, or cavity (i) exposing the pn junction at the interface between the p-doped electrode and the n-doped electrode or (ii) with a first sidewall substantially aligned with the interface between the p-doped electrode and the n-doped electrode;

forming a first doped semiconductor layer in the first trench, opening, or cavity, wherein the first doped semiconductor layer is on at least one of the p-doped electrode and the n-doped electrode and has a same doping type as the other of the p-doped electrode and the n-doped electrode;

forming a second doped semiconductor layer on the first doped semiconductor layer in the first trench, opening, or cavity, wherein the second doped semiconductor layer has a same doping type as the one of the p-doped electrode and the n-doped electrode;

forming a second patterned insulator layer on the first and second doped semiconductor layers and the p-doped and n-doped electrodes, the second patterned insulator layer having a second trench, opening, or cavity exposing at least part of the second doped semiconductor layer;

forming a first vertical region in or through the second trench, opening, or cavity the first vertical region electrically connecting the second doped semiconductor layer with the one of the p-doped electrode and the n-doped electrode; and forming a cladding layer on or over an uppermost surface of the second semiconductor layer, the first vertical region, and on at least one sidewall of each of the first and second semiconductor layers.

15. The method of claim 14, wherein the substrate comprises a first insulator layer and a semiconductor layer on the first insulator layer, and the p-doped electrode and the n-doped electrode are formed in the semiconductor layer.

16. The method of claim 14, wherein forming the first and second doped semiconductor layers comprises epitaxially growing the first and second doped semiconductor layers sequentially in the first trench, opening, or cavity.

17. The method of claim 14, further comprising:

forming a third doped semiconductor layer on the second doped semiconductor layer, the third doped semiconductor layer having a same doping type as the other of the p-doped electrode and the n-doped electrode, and forming a second vertical region electrically connecting the third doped semiconductor layer with the other of the p-doped electrode and the n-doped electrode.

18. The method of claim 17, further comprising forming a fourth doped semiconductor layer on the third doped semiconductor layer, the fourth doped semiconductor layer having a same doping type as the one of the p-doped electrode and the n-doped electrode, wherein the first vertical region electrically connects the fourth doped semiconductor layer with the one of the p-doped electrode and the n-doped electrode.

19. The method of claim 15, wherein:

the first doped semiconductor layer is on the n-doped electrode, is in electrical contact with the p-doped electrode, and has the same doping type as the p-doped electrode; and the second doped semiconductor layer and the first vertical region have the same doping type as the n-doped electrode.

20. The method of claim 15, wherein forming the cladding layer comprises:
- depositing a second insulator layer on the second patterned insulator layer sufficient to fill the second trench, opening, or cavity, and planarizing the second insulator layer; or
- removing the second patterned insulator layer, blanket-depositing a second insulator layer on the first and second semiconductor layers and the p-doped and n-doped electrodes, the second insulator layer having a thickness greater than a combined height of the first and second semiconductor layers, and planarizing the second insulator layer.

\* \* \* \* \*